(12) United States Patent
Kamisoyama et al.

(10) Patent No.: US 9,374,493 B2
(45) Date of Patent: Jun. 21, 2016

(54) IMAGE SCANNER AND IMAGE SCANNING METHOD

(71) Applicant: FUNAI ELECTRIC CO., LTD., Osaka (JP)

(72) Inventors: Shinichi Kamisoyama, Shijonawate (JP); Yoshimi Morita, Moriguchi (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/603,643

(22) Filed: Jan. 23, 2015

(65) Prior Publication Data

US 2015/0215489 A1    Jul. 30, 2015

(30) Foreign Application Priority Data

Jan. 24, 2014  (JP) ................................. 2014-011486
Mar. 3, 2014   (JP) ................................. 2014-040865
Dec. 5, 2014   (JP) ................................. 2014-246947

(51) Int. Cl.
    *H04N 1/04*      (2006.01)
    *H04N 1/203*     (2006.01)
    *H04N 1/409*     (2006.01)
    *H04N 1/028*     (2006.01)
    *H04N 1/10*      (2006.01)

(52) U.S. Cl.
    CPC .......... *H04N 1/2032* (2013.01); *H04N 1/02815* (2013.01); *H04N 1/10* (2013.01); *H04N 1/4095* (2013.01)

(58) Field of Classification Search
    CPC .... H04N 1/4095; H04N 1/02815; H04N 1/10
    USPC .................................. 358/474, 498, 497, 475
    See application file for complete search history.

(56) References Cited

U.S. PATENT DOCUMENTS 7,672,023 B2 *  3/2010  Tse ...................... G03G 15/607
                                                           358/474
2007/0229923 A1  10/2007  Itagaki et al.
2009/0190181 A1   7/2009  Ohkawa
2009/0323092 A1  12/2009  Itagaki et al.
2011/0122428 A1   5/2011  Itagaki et al.

FOREIGN PATENT DOCUMENTS

| EP | 0 949 802    | 10/1999 |
| JP | 5-22572      | 1/1993  |
| JP | 9-116753     | 5/1997  |
| JP | 2000-92324   | 3/2000  |
| JP | 2002-252767  | 9/2002  |
| JP | 2003-309715  | 10/2003 |

(Continued)

OTHER PUBLICATIONS

Extended European Search Report issued Jul. 29, 2015 in corresponding European Application No. 15152152.3.

*Primary Examiner* — Houshang Safaipour
(74) *Attorney, Agent, or Firm* — Wenderoth, Lind & Ponack, L.L.P.

(57) ABSTRACT

An image scanner includes: a lid or a backing sheet as a cover unit on which a pattern is depicted; a sensor unit configured to scan a document between a platen and the cover unit; and an image processing unit configured to set a threshold value using information on a first transmitted pattern of the pattern, obtained through the document, and perform image processing based on the threshold value.

20 Claims, 18 Drawing Sheets

(56) References Cited

FOREIGN PATENT DOCUMENTS

| JP | 2005-39420 | 2/2005 |
|---|---|---|
| JP | 2005-277886 | 10/2005 |
| JP | 2006-197445 | 7/2006 |
| JP | 2007-134931 | 5/2007 |
| JP | 2007-272112 | 10/2007 |
| JP | 2010-4448 | 1/2010 |
| JP | 2010-114648 | 5/2010 |
| JP | 4895357 | 3/2012 |
| WO | 2010/056238 | 5/2010 |

* cited by examiner

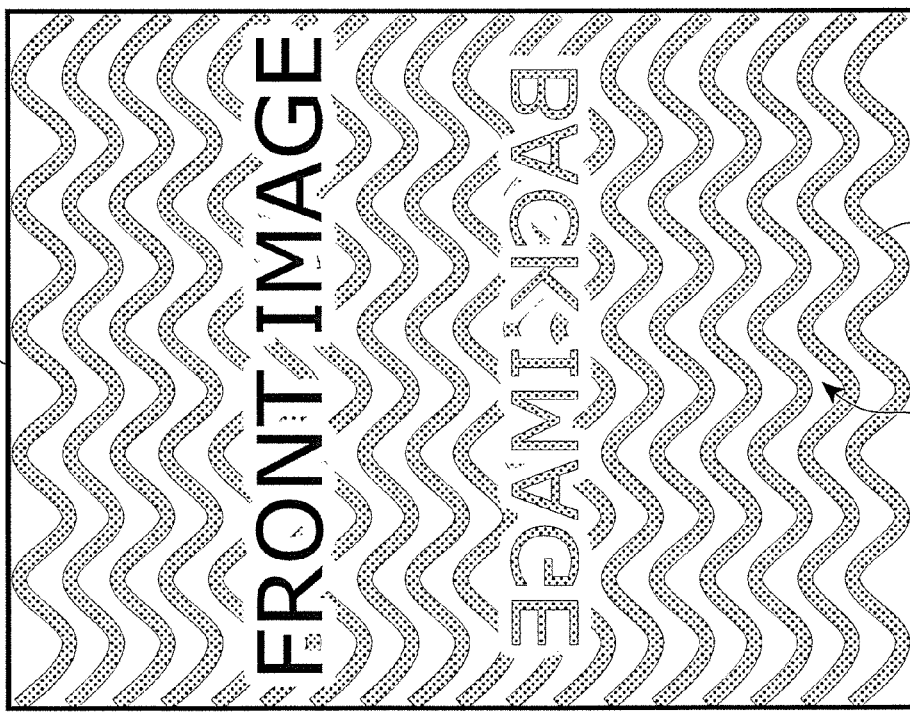

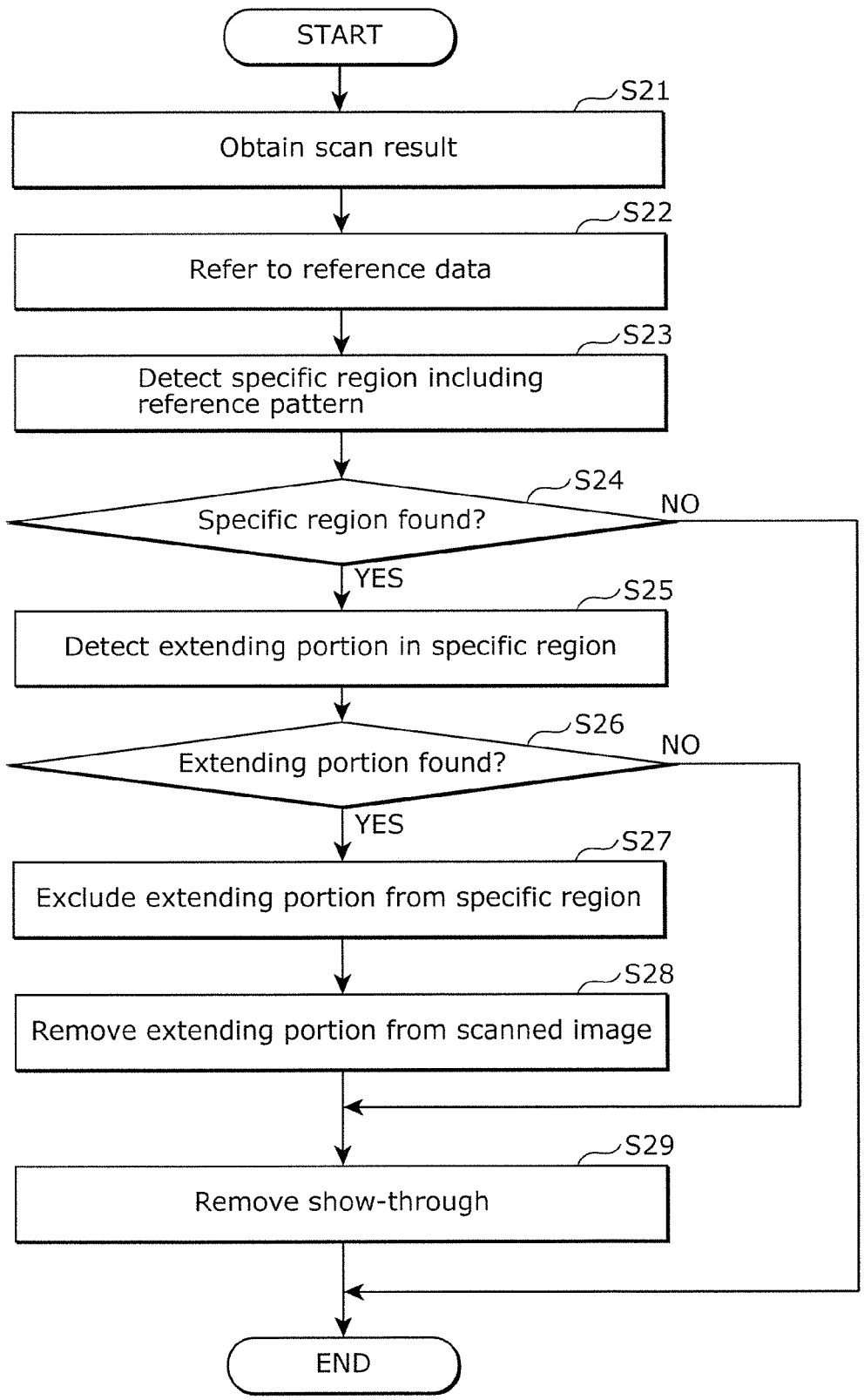

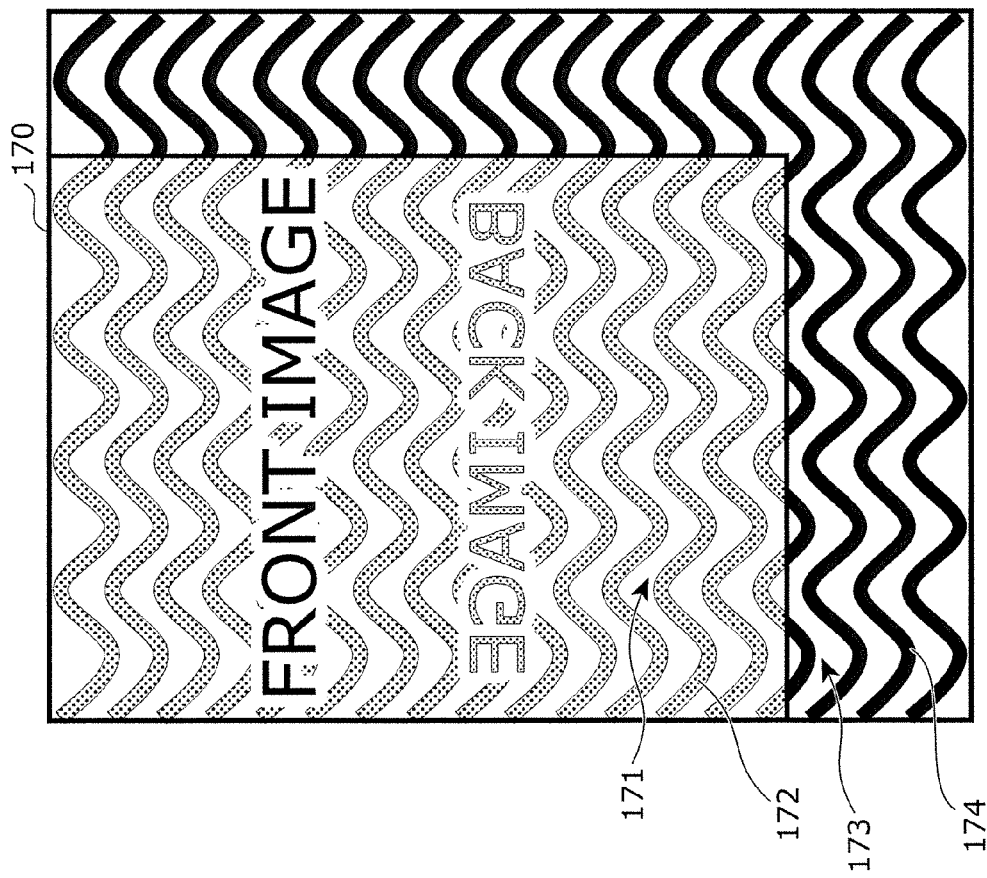

IMAGE SCANNER AND IMAGE SCANNING METHOD

CROSS REFERENCE TO RELATED APPLICATION

The present application is based on and claims priority of Japanese Patent Applications No. 2014-011486 filed on Jan. 24, 2014, No. 2014-040865 filed on Mar. 3, 2014, and No. 2014-246947 filed on Dec. 5, 2014. The entire disclosure of the above-identified applications, including the specifications, drawings and claims is incorporated herein by reference in its entirety.

FIELD

The present invention relates to an image scanner and an image scanning method, and, more particularly, to an image scanner and an image scanning method including a function for removing show-through.

BACKGROUND

Photocopiers, scanners, and multifunction peripherals including the functions of these devices, for example, include an image scanner that scans a document.

Examples of image scanners include a flatbed image scanner. Flatbed image scanners typically include a main body that includes a platen on which the document is placed, and a scanning unit that scans the document. Flatbed image scanners also typically include a lid (cover) that covers the platen and the document during scanning. The scanning unit includes a light source that projects light from inside the chassis of the main body onto the document, a sensor unit that receives light reflected off the document, and a sensor driving unit that moves the sensor unit. The lid includes a holding component, which is a cushion that holds down the document. With flatbed image scanners, the document is fixed in place on the platen and scanned by moving imaging elements with the sensor driving unit.

There is a demand for an increase in the image reproduction accuracy of image scanners.

CITATION LIST

Patent Literature

[PTL 1] Japanese Unexamined Patent Application Publication No. 5-22572.
[PTL 2] Japanese Unexamined Patent Application Publication No. 09-116753.
[PTL 3] Japanese Unexamined Patent Application Publication No. 2007-134931.

SUMMARY

Technical Problem

When a document having images on both sides is scanned with an image scanner, depending on how much light the document transmits, the image scanner may not only scan images on the side of the document facing the scanning unit (hereinafter also simply referred to as the front side), but images on the side of the document opposite the front side (hereinafter also simply referred to as the back side) as "show-through" as well. How much light the document transmits depends on, for example, the material of the document paper. The appearance of show-through in the scanned image corresponds to a decrease in image reproduction accuracy.

An object of the present invention is to provide an image scanner and an image scanning method capable of increasing image reproduction accuracy by accurately removing show-through.

Solution to Problem

In order to achieve the above object, an image scanner according to one aspect of the present invention includes: a platen on which a document is placed; a cover unit on which a pattern is depicted; a scanning unit configured to scan a first side of the document while the cover unit is in contact with a second side of the document opposite the first side; and an image processing unit configured to set a threshold value based on a brightness of a transmitted pattern obtained from a result of the scan and corresponding to the pattern, and remove show-through appearing in a processing region having a brightness greater than or equal to the threshold value.

The above image scanner automatically sets the threshold value lower for documents that transmit more light (high transmittance documents) and thus produce more show-through, resulting in a greater correction range. This allows the image scanner to reduce regions where show-through remains. Likewise, the image scanner automatically sets the threshold value higher for documents that transmit less light and thus produce less show-through, resulting in a smaller correction range. This allows the image scanner to prevent an excessive decrease in image reproduction accuracy.

In other words, the image scanner achieves both the advantageous effect of accurately removing show-through and preventing an excessive decrease in image reproduction accuracy. Moreover, the image scanner is not required to perform complex computations such as calculating the transmittance of the document; the image scanner is capable of achieving these advantageous effects with simple processing. This lightens the processing load of the image scanner.

The image processing unit may be configured to set the threshold value to the brightness of the transmitted pattern.

The above image scanner can appropriately set the threshold value since the image scanner sets the threshold value to the brightness of the pattern. When the pattern is a black pattern in particular, the brightness of the transmitted pattern corresponds to the brightness of regions where show-through is the densest. Consequently, when the pattern is a black pattern, it is possible to remove all of the show-through in particular by setting the threshold value to the brightness of the transmitted pattern.

The pattern of the cover unit may include a first pattern and a second pattern less dense than the first pattern, and the image processing unit may be configured to correct a brightness of the processing region based on a brightness of a second transmitted pattern obtained from the result of the scan and corresponding to the second pattern.

The above image scanner sets the processing range (the processing region) based on the brightness of the first transmitted pattern and sets the target brightness for the show-through region, which is a region where show-through appears, based on the brightness of the second transmitted pattern. This allows the image scanner to appropriately correct the brightness of the processing region.

The image processing unit may be configured to convert the brightness of the processing region to the brightness of the second transmitted pattern.

Use of the brightness of the second transmitted pattern allows the above image scanner to appropriately convert the brightness of the processing region. When the second pattern is a white pattern in particular, the brightness of the second transmitted pattern corresponds to the brightness of the base color of the document. In other words, when the second pattern is a white pattern, the scanner can convert the brightness of the processing region to a brightness corresponding to the base color of the document.

The image processing unit may be configured to not correct the brightness of the processing region when a difference between a brightness of a first transmitted pattern and the brightness of the second transmitted pattern is less than or equal to a predetermined value, the first transmitted pattern obtained from the result of the scan and corresponding to the first pattern.

When the difference between the brightness of the first transmitted pattern and the brightness of the second transmitted pattern is less than or equal to a predetermined value (hereinafter also simply referred to as the difference in brightness), the image scanner can determine that the document will produce substantially no show-through when scanned. Configuring the image scanner to not correct the brightness of the image processing region in this case makes it possible to prevent a loss of image reproduction accuracy. This also makes it possible to avoid unnecessary corrections, which lightens the processing load of the image scanner.

While the cover unit is disposed in a location corresponding to a scanning reference location to which a corner of the document is aligned, a location of the pattern depicted on the cover unit may correspond to the scanning reference location, and the scanning unit may be configured to scan the document while the cover unit is disposed in the location corresponding to the scanning reference location.

The scanning reference location corresponds to a region of the document not likely to contain any images. The above image scanner can obtain an accurate transmitted pattern since the pattern is depicted in a location corresponding to the scanning reference location.

The image scanner according to one aspect of the present invention may further include a reference data memory in which reference data representing the pattern is stored in advance and a detection unit configured to use the reference data to detect, in a scanned image obtained from the result of the scan, a specific region including the transmitted pattern. The image processing unit may be configured to set the threshold value based on a brightness of the specific region detected by the detection unit.

With the above image scanner, a reference pattern for removing show-through can be superimposed on the scanned image by scanning the document with a backing sheet placed on the back side of the document. This allows for an appropriate reference pattern to be chosen in accordance with the image depicted on the document.

This eases design restrictions for the image scanner and restrictions that limit product development flexibility, making it possible to achieve an image scanner suitable for removing show-through.

The detection unit may be configured to detect an extending portion extending beyond an edge of the document by detecting a portion of the specific region having a brightness lower than a predetermined value, and exclude the extending portion from the specific region.

With the above scanner, when the backing sheet is larger than the document, the processing for removing show-through may appropriately process the extending portion of the backing sheet extending from an edge of the document.

Note that one or more illustrative embodiments disclosed herein can be implemented not only as an image scanner including these characterizing processing units, but also as an image scanning method which employs the processes performed by the characterizing processing units included in the image scanner as steps. One or more illustrative embodiments disclosed herein can also be implemented as a computer program for operating a computer, acting as the characterizing processing units included in the image scanner, or a computer program that causes a computer to execute the characterizing steps included in the image scanning method. It goes without saying that this computer program can be circulated on a computer-readable, non-transitory storage media such as a compact disc-read only memory (CD-ROM), or over a communications network such as the Internet.

Advantageous Effects

The present invention is capable of providing an image scanner and an image scanning method that can accurately remove show-through.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 8 illustrates one example of a preview image of a document that does not produce show-through.

FIG. 16 illustrates one example of a scanned image obtained according to Embodiment 2.

FIG. 17 illustrates one example of a corrected scanned image removed of show-through according to Embodiment 2.

FIG. 18 is a flow chart of one example of operations performed by an image scanner according to Embodiment 3.

FIG. 19 illustrates one example of a scanned image obtained according to Embodiment 3.

FIG. 20 illustrates one example of a scanned image removed of show-through and an extending portion according to Embodiment 3.

Figure 1:
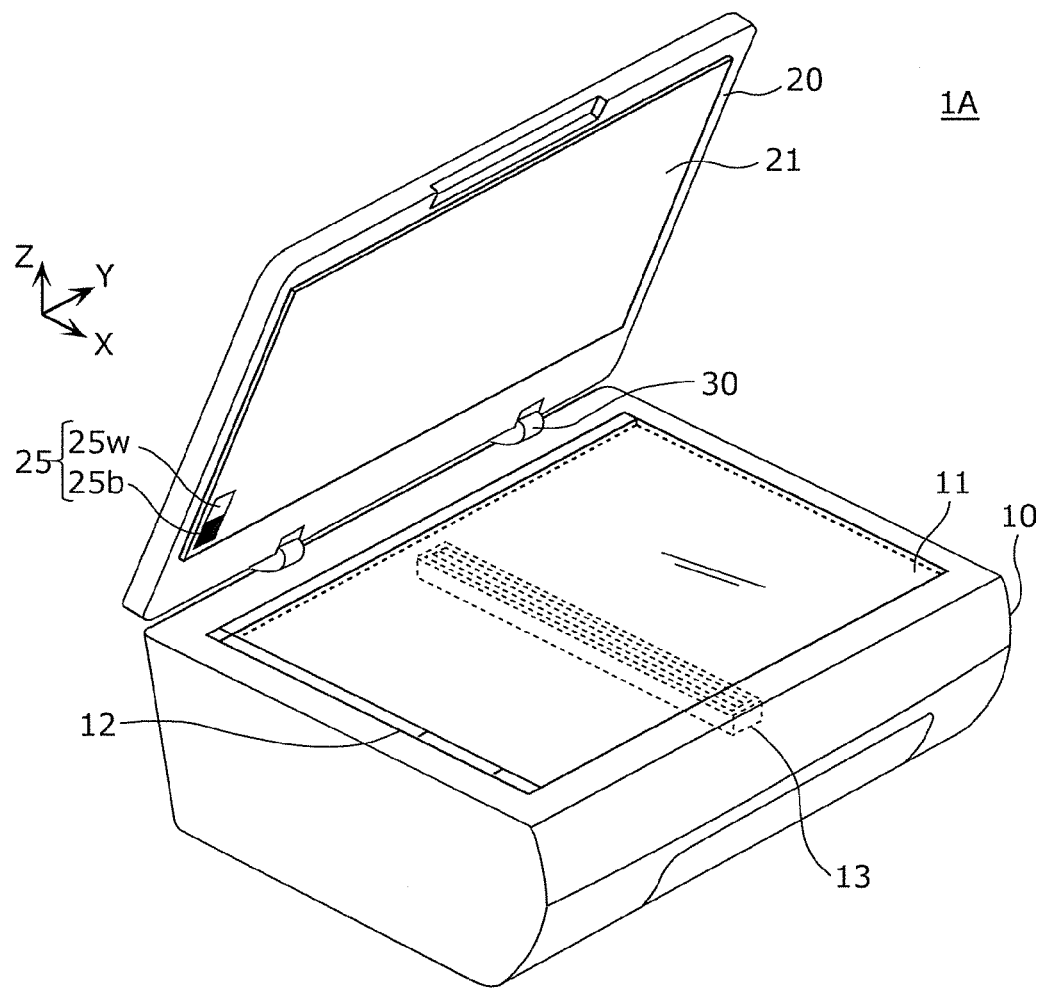
FIG. 1 is an external view of one example of a multifunction peripheral including an image scanner according to an embodiment.

DESCRIPTION OF EMBODIMENTS (Details Regarding the Technical Problem)

One method for reducing show-through includes using a black or substantially black holding component in the lid (Comparative Example 1). With this method, images on the back side of the document blend in with the black color of the holding component. This reduces the visibility of the show-through region and improves image reproduction accuracy.

However, guaranteeing the quality of the reproduced image when the holding component is a color other than the typical white color is difficult.

Another method for removing show-through includes scanning the document and then performing show-through removal processing on the result of the scan to removing show-through (Comparative Example 2).

This method makes use of the fact that show-through regions where show-through appears generally have a high brightness (are generally substantially white in color) in order to determine regions that have a brightness greater than or equal to a given threshold value to be show-through regions. Since show-through regions are originally white on the document, the brightness of the regions determined to be show-through regions are converted to a brightness corresponding to white. This method makes it possible to remove show-through to a certain degree, and quality can be guaranteed since the color of the holding component is not changed.

However, with Comparative Example 2, the threshold value for performing the show-through removal processing is a fixed value, regardless of how much light the document at hand transmits. Since, however, how much light the document transmits is not a constant value, documents that transmit a lot of light produce a show-through region color that is dark overall (brightness is low overall). This circumstance is problematic because the show-through cannot be sufficiently removed. Conversely, with documents that transmit little light, there are instances where even the brightness for regions outside of the show-through region is converted to a brightness corresponding to white. This circumstance is problematic because it results in a loss of image reproduction accuracy in bright regions.

In light of this, in an effort to increase the image reproduction accuracy in show-through removal processing, a method of using a scan result of the back side of the document to remove show-through appearing on the front side of the document has been proposed (for example, see Patent Literature (PTL) 1).

The image scanner disclosed in PTL 1 makes it possible to accurately compute the show-through region and the brightness of the show-through region and increase image reproduction accuracy by using the scan result of the back side of the document.

However, the image scanner disclosed in PTL 1 requires both sides of the document to be scanned. Consequently, a problem of the image scanner disclosed in PTL 1 is that it cannot operate autonomously when it is applied to image scanners which do not include a function for scanning both sides of a document. In order to apply the image scanner disclosed in PTL 1 to image scanners which do not include a function for scanning both sides of a document, the user must turn the document over him or herself. Moreover, when this is necessary, there is a problem that the document may be misaligned after being turned over, making it impossible to aptly identify the show-through region.

PTL 2 discloses computing the light transmittance of the document from a reference mark on a document roller, and then subtracting the reference mark image data from the document image data and converting the document image data to a base level.

PTL 3 discloses computing the light transmittance of a document by using patch strips of the patent pressure plate that are arranged in an image readable and image reproduction disabled region, and processing the scanned image in accordance with the computed light transmittance.

Problems with PTL 2 and 3 include the fact that the light transmittance of the document media must be accurately computed to remove the reference mark and show-through from the scanned image.

Hereinafter, certain exemplary embodiments are described in greater detail with reference to the accompanying Drawings. Note that the Drawings are schematic drawings, and may not depict exact dimensions or dimensional ratios.

Each of the illustrative embodiments described below shows a general or specific example. The numerical values, shapes, structural elements, the arrangement and connection of the structural elements, steps, the processing order of the steps etc. shown in the following illustrative embodiments are mere examples, and therefore do not limit the scope of the present invention, which is limited by the appended Claims. Therefore, among the structural elements in the following illustrative embodiments, structural elements not recited in any one of the independent claims are described as preferred structural elements, and are not absolutely necessary to overcome the problem according to the present invention.

Embodiment 1

The image scanner according to Embodiment 1 will be described with reference to FIG. 1 through FIG. 8.

The image scanner according to Embodiment 1 is exemplified as a flatbed image scanner provided in a multifunction peripheral. The multifunction peripheral includes functions for printing and faxing, for example, in addition to the scanning performed by the image scanner according to Embodiment 1. Note that descriptions regarding the printing and faxing functions are omitted from Embodiment 1.

In the show-through removal processing for removing the show-through, the image scanner according to Embodiment 1 is configured to adaptively set a threshold value for stipulating a range for the show-through removal processing, based on a measurement result of the light transmittance of the document. The light transmittance of the document is measured by scanning the document while the cover unit on which the pattern is depicted is in contact with the back side of the document.

Note that in Embodiment 1, the cover unit is exemplified as the lid 20 (cover).

Note that the "document" refers to the media to be scanned, and is any object that can be scanned while the lid is closed. Examples of the document include, for example, paper, film, brochures, and books (that can be scanned while the lid is closed).

1-1 Image Scanner Configuration

FIG. 1 is an external view illustrating an example of a multifunction peripheral 1A, which includes the image scanner according to Embodiment 1.

As illustrated in FIG. 1, the multifunction peripheral 1A includes a main body 10, a lid 20, and a hinge 30. The main body 10 and the lid 20 are coupled by the hinge 30.

The main body 10 includes a glass platen 11, an image scanner structure (a structure including a sensor unit 13), and a control unit.

The glass platen 11 is one example of the platen on which the document is placed, and covers a rectangular opening provided in the top of the chassis of the main body 10. The top of the chassis includes a guide 12 next to the top side (rear side) and left side (left side in FIG. 1) of the glass platen 11. The guide 12 indicates positions for aligning the document. The guide 12 is, for example, a graphic illustrated on a top surface of the chassis, and the graphic includes, for example, lines or indicators such as "A4" and "B5" indicating alignment positions. Note that in Embodiment 1, aligning the document means placing the document on the glass platen 11 and positioning the document for scanning. Moreover, hereinafter, the top left of the glass platen 11 shall be a scanning reference location indicating a standard location that the document is aligned with. Here, the coordinates (x, y) for the scanning reference location are (0, 0).

The image scanner structure is one example of the scanning unit that scans the document, and includes a light source (not shown in the Drawings) that projects light from inside the chassis of the main body onto the document, the sensor unit 13 including imaging elements that receive light reflected off the document, and a sensor driving unit (not shown in the Drawings) that moves the sensor unit 13 along the Y axis. Upon scanning, the image scanner structure uses the light source to project light on the document, while the document is fixed in place on the glass platen 11, and receives light reflected back from the document with the imaging elements included in the sensor unit 13 while moving the sensor unit 13 from the starting point set at the left hand side toward the right hand side. The sensor unit 13 outputs a signal in accordance with the strength of the reflected light received by the imaging elements.

The lid 20 is one example of the cover. The lid 20 includes a holding component 21 that contacts the back side of the document and holds the document down on the glass platen 11 when the lid 20 is closed.

The holding component 21 is, for example, a plate-like cushion. The surface area of the holding component 21 is either the same as or slightly larger than the surface area of the glass platen 11. A pattern 25 is depicted on the part of the holding component 21 that is in contact with the back side of the document when the lid 20 is closed. The pattern 25 is a pattern for measuring the degree of show-through. The pattern 25 will be described in detail later on.

The control unit controls the operations of each component included in the image scanner, such as the image scanner structure. The control unit includes an image processing unit (not illustrated in FIG. 1; see FIG. 2) that performs processing for removing show-through.

Figure 2:
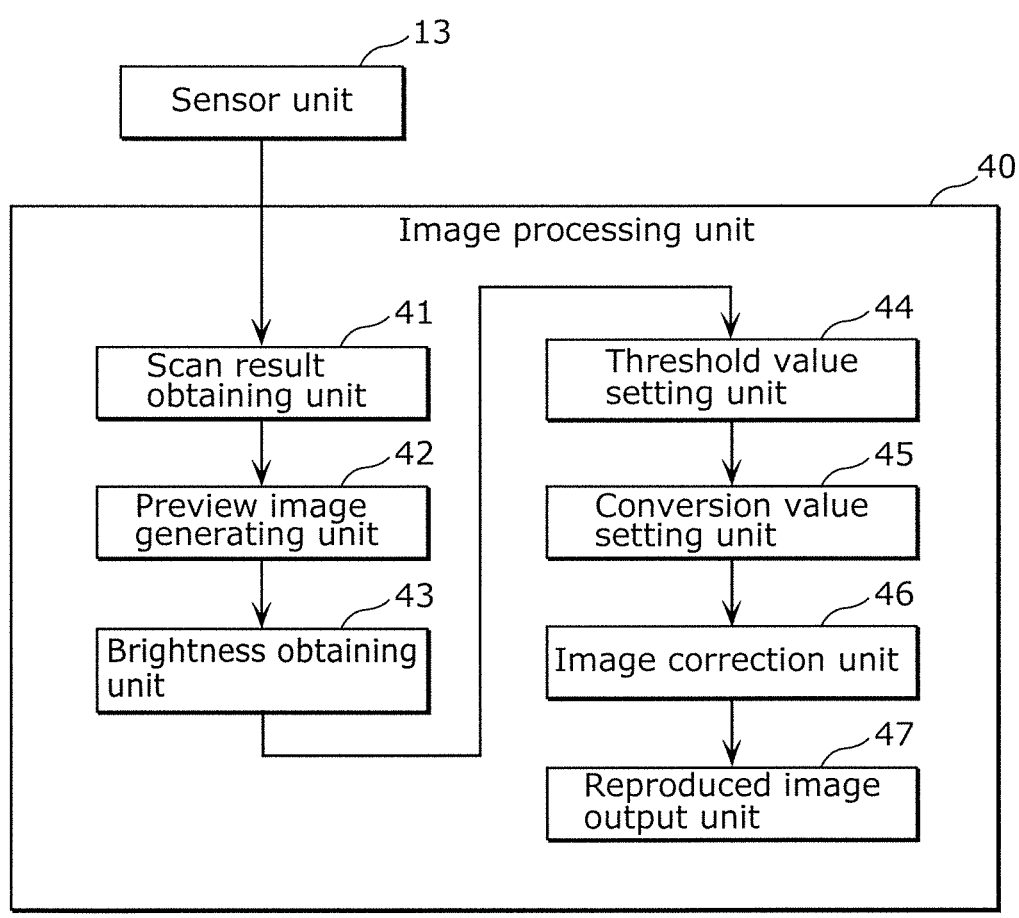
FIG. 2 is a block diagram of one example a configuration of an image processing unit included in an image scanner according to an embodiment.

FIG. 2 is a block diagram illustrating one example of a configuration of an image processing unit 40. As illustrated in FIG. 2, the image processing unit 40 includes a scan result obtaining unit 41, a preview image generating unit 42, a brightness obtaining unit 43, a threshold value setting unit 44, a conversion value setting unit 45, an image correction unit 46, and a reproduced image output unit 47. A detailed description of each unit will be given in the operations section.

Note that in Embodiment 1, the control unit is exemplified as, but not limited to, being configured using large scale integration (LSI). For example, the control unit may be realized as a result of a central processing unit (CPU) executing a computer program (software) executing the show-through removal method according to Embodiment 1.

As described above, the hinge 30 couples the main body 10 and the lid 20. The hinge 30 is configured to allow the lid 20 to sit a prescribed angle relative to the main body 10, such as 46 degrees or 60 degrees.

1-2 Pattern Configuration

The pattern 25 will be described with reference to FIG. 3. As described above, the pattern 25 is a pattern for measuring the degree of show-through. It is possible to compute the degree of show-through from the density (brightness) of a transmitted pattern obtained by scanning the pattern 25.

Figure 3:
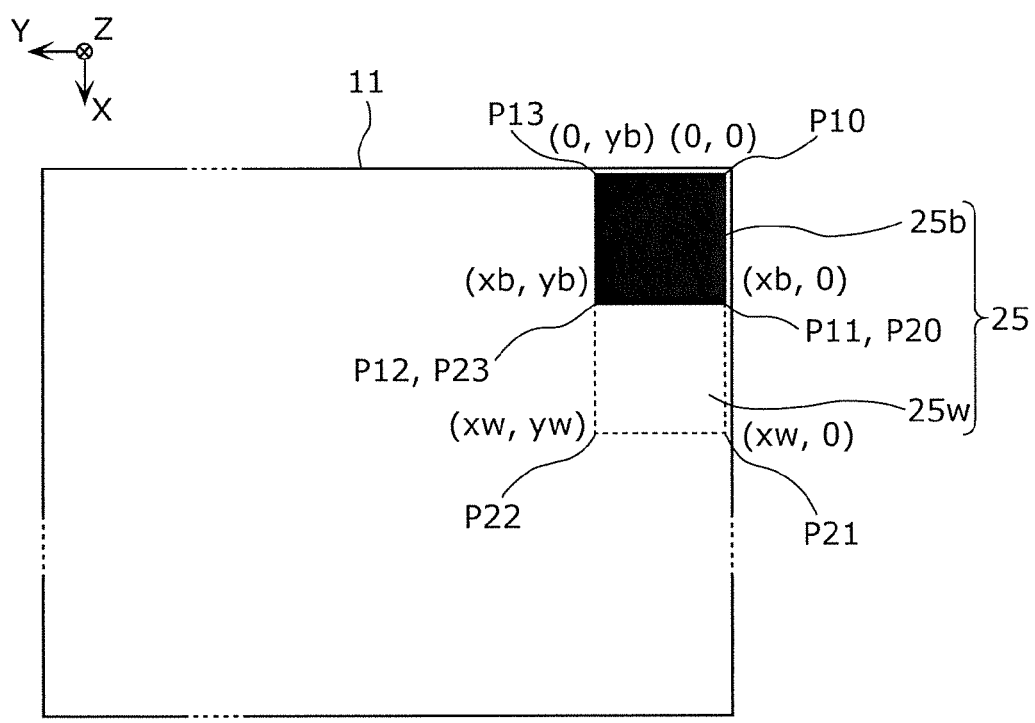
FIG. 3 illustrates one example of a configuration of a first pattern.

FIG. 3 illustrates one example of a configuration of the pattern 25. FIG. 3 illustrates the pattern 25 when viewed from inside the chassis of the main body while the lid 20 is closed. Note that in FIG. 3, the coordinates for P10 in the upper right corner are (0, 0). As described above, the coordinates (0, 0) in FIG. 1 indicate the scanning reference location to which a corner of the document is set when a user aligns a standard size document such as A4 or B5 document on the glass platen 11. In FIG. 1, this corresponds to the upper left corner of the glass platen 11.

The pattern 25 includes two patterns: a first pattern 25b and a second pattern 25w. Note that for the purpose of illustration, FIG. 3 shows a gap between the glass platen 11 and the first pattern 25b and a gap between the glass platen 11 and the second pattern 25w, but in actuality, there preferably is no gap.

The entire region of the first pattern 25b has a uniform color and brightness. The first pattern 25b is a relatively dense pattern. In Embodiment 1, since the first pattern 25b is a pattern depicted for computing the threshold value for setting the processing region, the first pattern 25b is black. Note that the first pattern 25b is not limited to a black pattern; the first pattern 25b may be any pattern that is denser than the second pattern 25w.

When the first pattern 25b is black and thus the densest pattern possible, the transmitted pattern corresponding to the first pattern 25b is the densest region of the show-through. Consequently, so long as the first pattern 25b is black, the threshold value may be directly set to the brightness of the transmitted pattern corresponding to the first pattern 25b.

The entire region of the second pattern 25w has a uniform color and brightness. The second pattern 25w is less dense than the first pattern 25b. In Embodiment 1, since the second pattern 25w is a pattern depicted for obtaining the brightness of the base color of the document—that is to say, the target brightness of the processing region—the second pattern 25w is white. Note that the second pattern 25w is not limited to a white pattern; the second pattern 25w may be any pattern that is less dense than the first pattern 25b.

In Embodiment 1, the first pattern 25b and the second pattern 25w are square shaped patterns.

In Embodiment 1, the size (of one side) of the first pattern 25b and the second pattern 25w is a size equal to the sum of a single pixel and the margin of error for the image scanner structure, so that the show-through removal processing can be performed on a preview image (one example of the scan result). The margin of error for the image scanner structure depends on, among other things, the configuration of the entire scanner.

The location of the first pattern 25b is set such that the corner P10 of the first pattern 25b overlaps the coordinates (0, 0), which is the scanning reference location. In other words, the first pattern 25b is disposed in a region including the scanning reference location. Note that the coordinates corresponding to the corners P11, P12, and P13 of the first pattern 25b are (xb, 0), (xb, yb), and (0, yb), respectively.

The second pattern 25w is designed so as to be adjacent to the first pattern 25b. In Embodiment 1, the second pattern 25w is disposed such that the corner P20 overlaps the corner P11 (coordinates (xb, 0)) of the first pattern 25b, and the corner P23 overlaps the corner P12 (coordinates (xb, yb)) of the first pattern 25b. Note that the coordinates corresponding to the corners P21 and P22 of the second pattern 25w are (xw, 0) and (xw, yw), respectively.

Typically, documents include top, bottom, right, and left borders that do not include any images. These borders are typically narrow and located further outward than, for example, the header and footer. Typically, there is a high possibility that borders including the scanning reference location do not include any images. In other words, there is a high possibility that these borders are simply the base color of the document. Disposing the pattern 25 in a region corresponding to these borders makes it possible to obtain an accurate measurement result with the pattern 25.

1-3 Show-Through Removal Processing Flow

The show-through removal processing flow will be described with reference to FIG. 4 through FIG. 8.

For simplification, the brightness is exemplified as having a range of 0 to 255 In Embodiment 1. Moreover, since the document has a base color, the scan result of the white regions is exemplified as having a brightness of 250, not 255.

Figure 4:
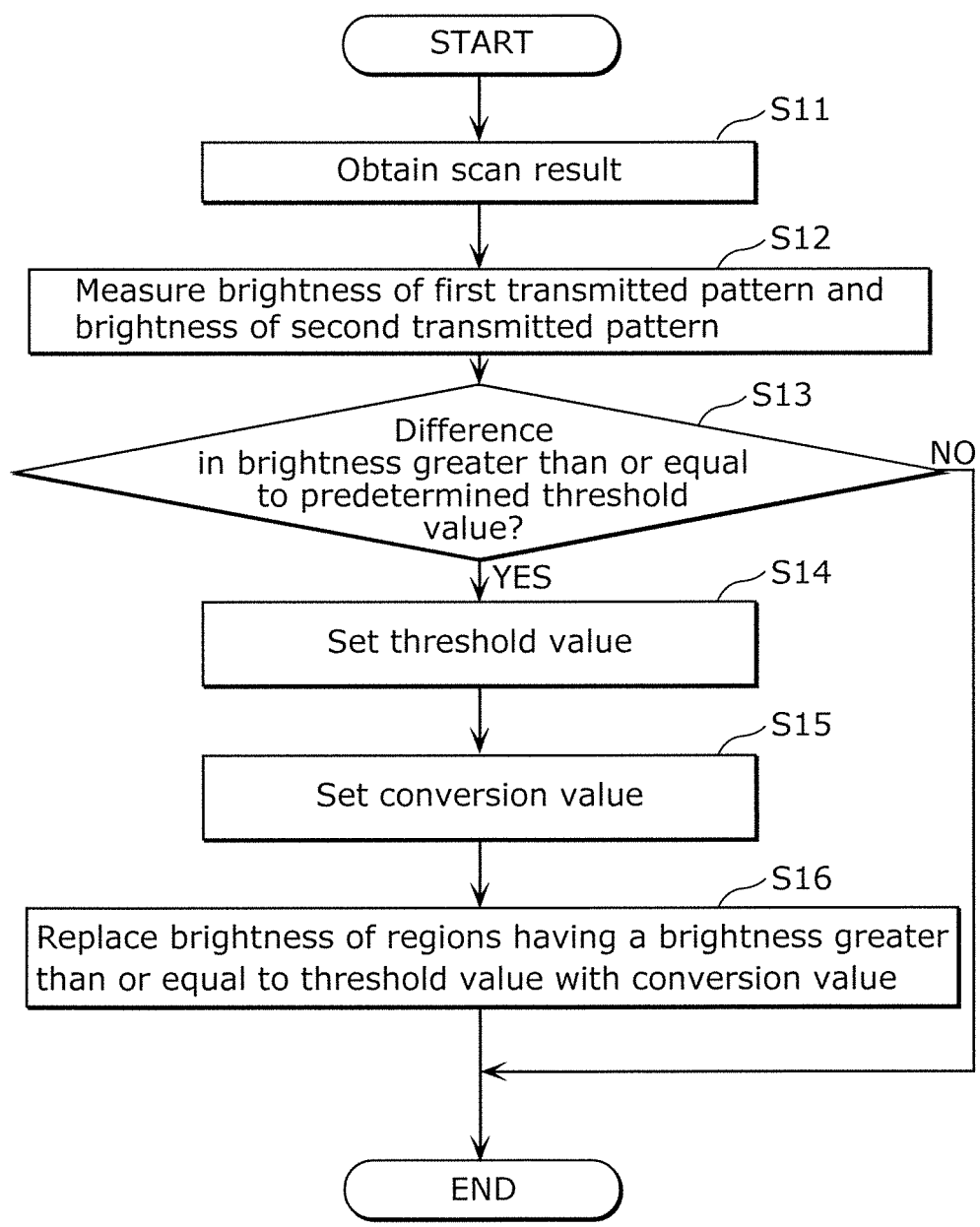
FIG. 4 is a flow chart of one example of the processing flow show-through removal processing according to an embodiment.

FIG. 4 is a flow chart of one example of the show-through removal processing flow.

The image processing unit 40 causes the sensor unit 13 to scan the document by controlling the image scanner structure after the document is aligned in place and a start command is received.

Figure 5:
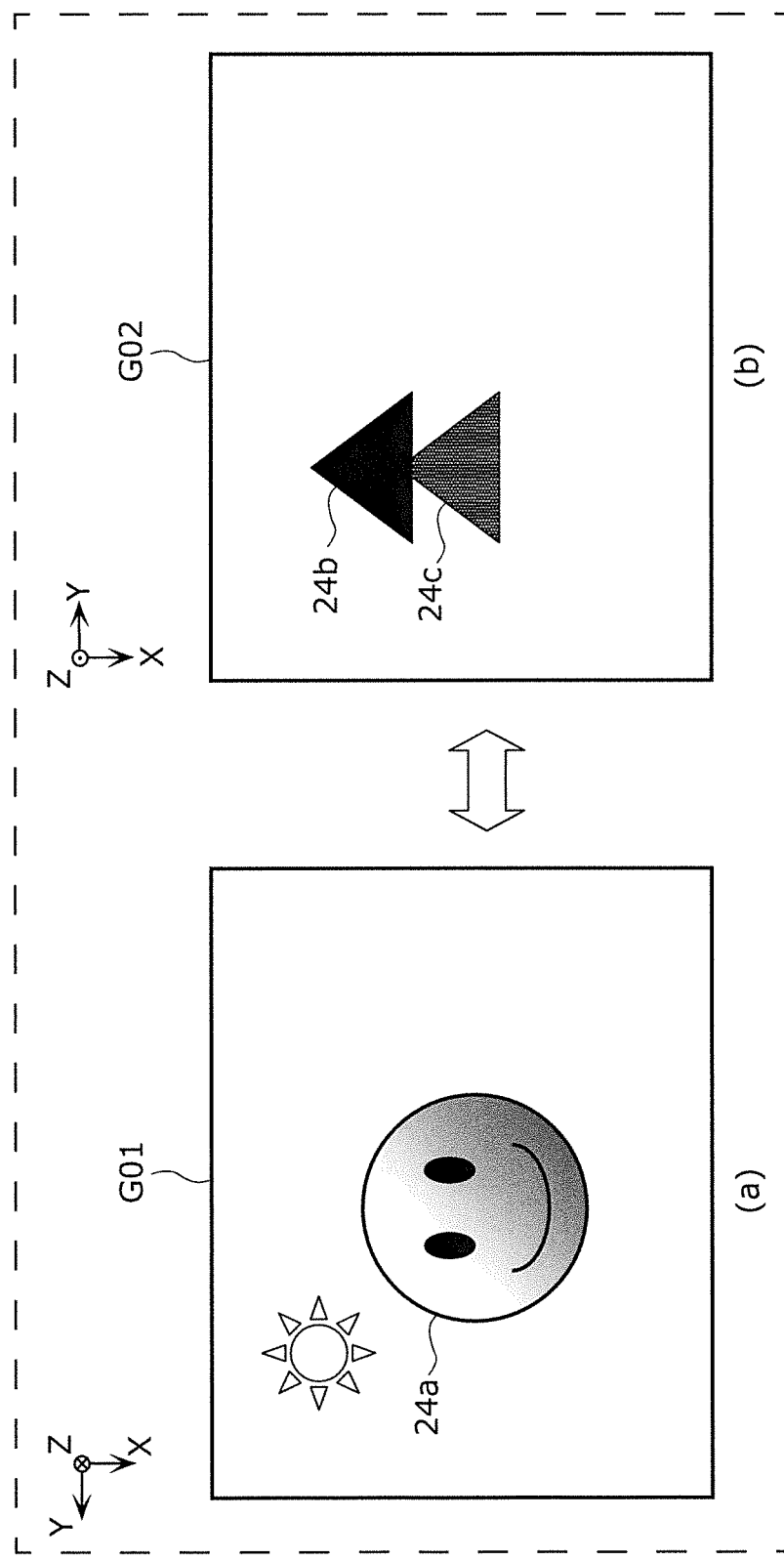
FIG. 5 illustrates one example of images depicted on a document according to an embodiment.

FIG. 5 illustrates one example of images depicted on the document used in Embodiment 1. (a) in FIG. 5 illustrates the front side of the document (the image to be scanned), and (b) in FIG. 5 illustrates the back side of the document. An image G01 including a pattern 24a is depicted on the front side of the document illustrated in (a) in FIG. 5. An image G02 including a pattern 24b substantially black in color and a pattern 24c less dense, i.e., brighter than the pattern 24b are depicted on the back side of the document illustrated in (b) in FIG. 5. In Embodiment 1, descriptions are given on the assumption that the document is scanned while the front surface of the document is aligned in the scanning reference location.

The scan result obtaining unit 41 receives a signal output from the sensor unit 13 as the scan result. The preview image generating unit 42 generates a preview image from the signal received by the scan result obtaining unit 41 (S11).

Figure 6:
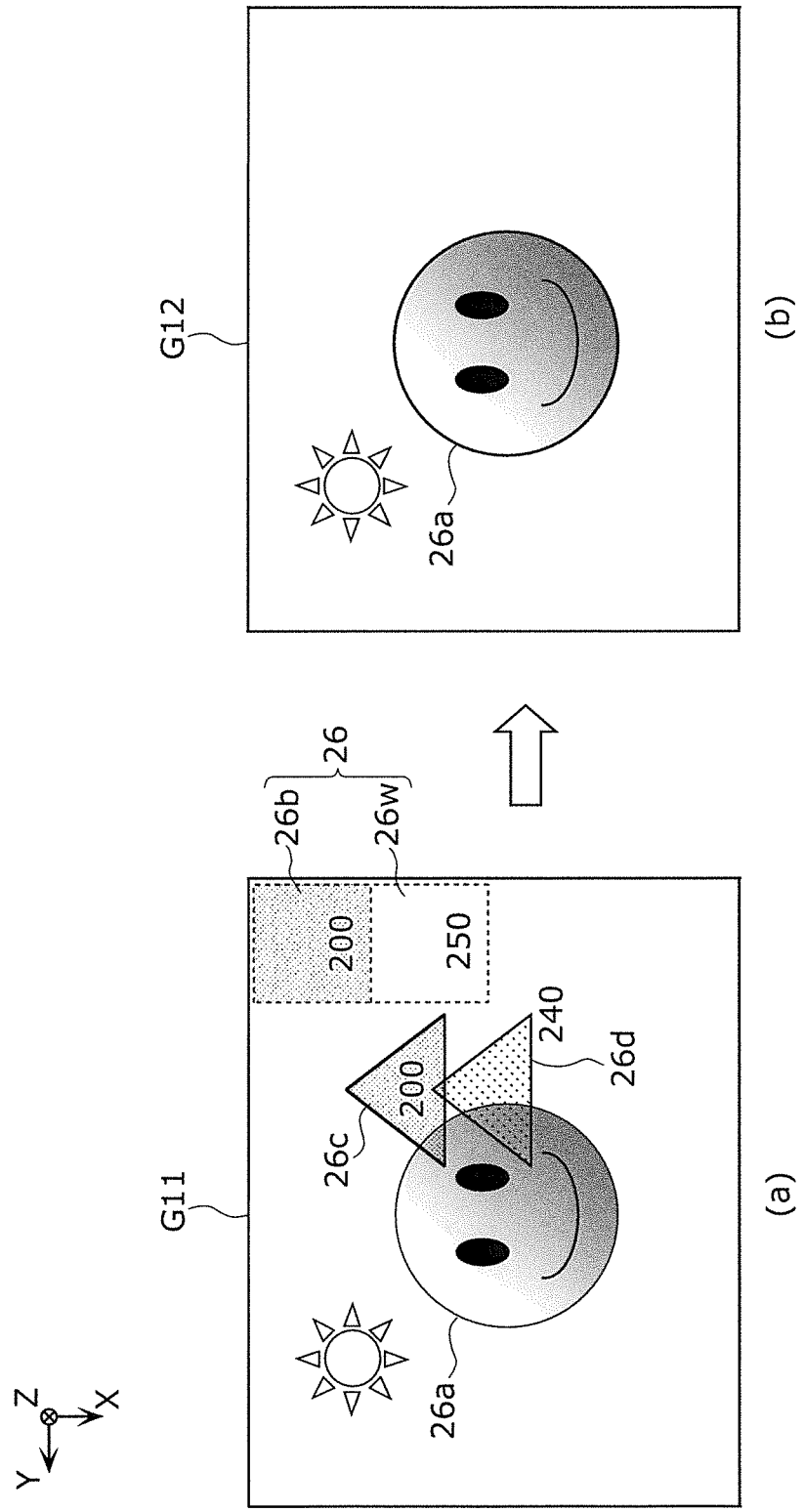
FIG. 6 illustrates one example of preview images before and after show-through removal processing according to an embodiment is performed.

FIG. 6 illustrates one example of preview images of a document having a high degree of show-through before and after show-through removal processing is performed. (a) in FIG. 6 illustrates the preview image G11 before show-through removal processing and (b) in FIG. 6 illustrates the preview image G12 after show-through removal processing.

Figure 7:
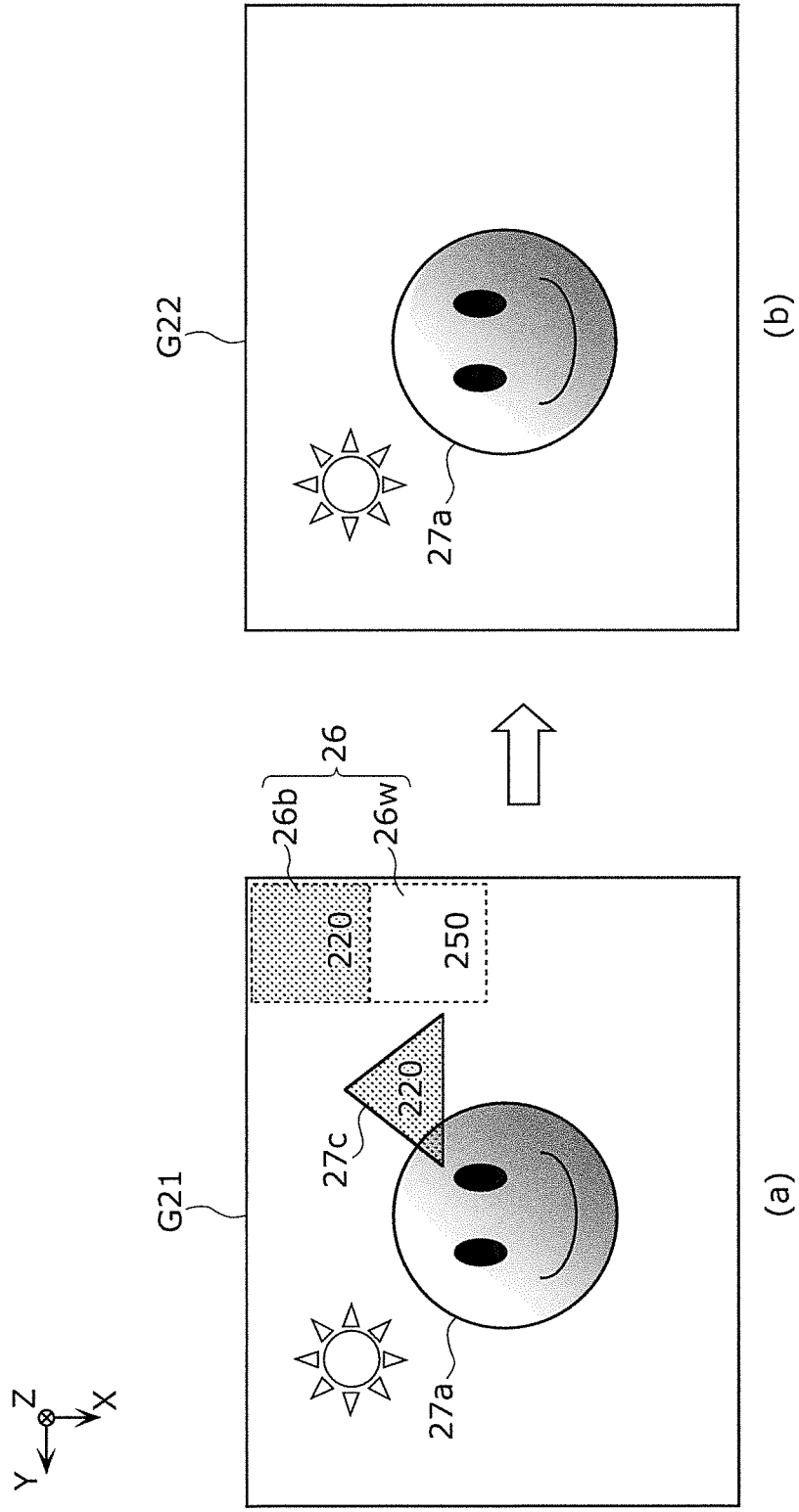
FIG. 7 illustrates one example of preview images before and after show-through removal processing according to an embodiment is performed.

FIG. 7 illustrates one example of preview images of a document having a low degree of show-through before and after show-through removal processing is performed. (a) in FIG. 7 illustrates the preview image G21 before show-through removal processing and (b) in FIG. 7 illustrates the preview image G22 after show-through removal processing.

Figure 8:
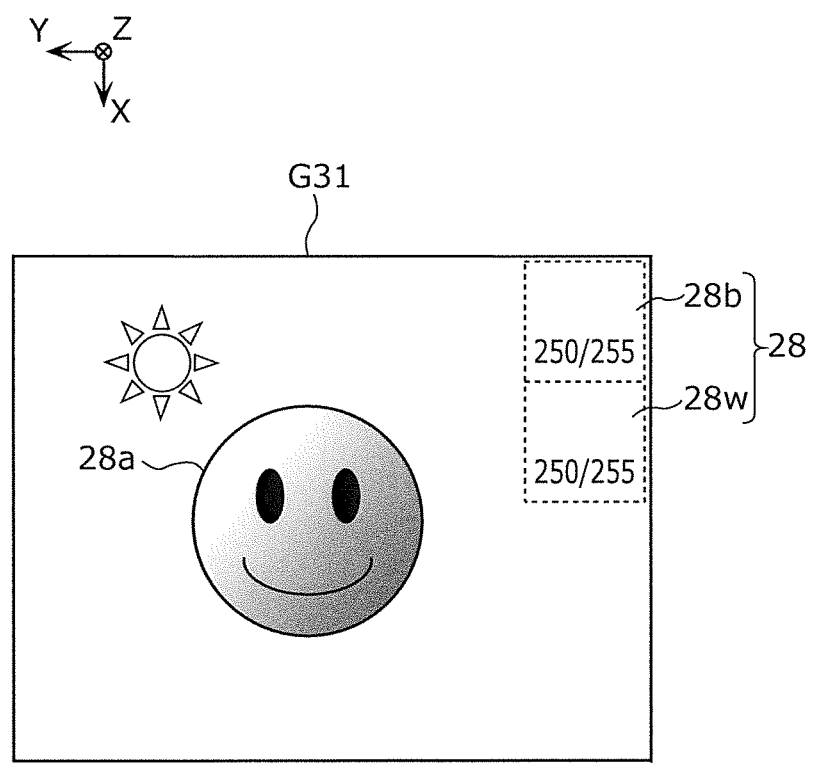

FIG. 8 illustrates one example of a preview image G31 of a document that does not produce show-through. The preview image G31 illustrated in FIG. 8 is the same as the image G01 illustrated in (a) in FIG. 5.

Note that for the purpose of illustration, the first transmitted pattern and the second transmitted pattern are depicted in FIG. 6 through FIG. 8 larger than they actually are; in actuality, they are of a size that can fit in the borders.

In FIG. 6, the image 26a is a scan target image illustrated on the front side of the document, and the images 26c and 26d are show-through images illustrated on the back side of the document. In FIG. 7, the image 27a is a scan target image illustrated on the front side of the document, and the image 27c is a show-through image illustrated on the back side of the document. In FIG. 7, since the document does not transmit a lot of light, the image corresponding to the image 26d in FIG. 6 does not show-through and therefore is not reproduced. In FIG. 8, the image 28a is a scan target image illustrated on the front side of the document. In FIG. 8, since show-through is not produced with the document, the images corresponding to the images 26c and 26d in FIG. 6 are not reproduced. In FIG. 6 through FIG. 8, the values near the respective images represent the brightness of the images. Note that in FIG. 6 through FIG. 8, the brightness is expressed in a range of 0 to 255, where 0 indicates a color ordinarily referred to as black and 255 indicates a color ordinarily referred to as white.

The brightness obtaining unit 43 measures the brightness of the first transmitted pattern corresponding to the first pattern 25b and the brightness of the second transmitted pattern corresponding to the second pattern 25w from the preview image generated by the preview image generating unit 42 (S12).

The brightness obtaining unit 43 first obtains reference data, on the pattern 25, that is stored in advance. Note that reference data is, for example, data indicative of, for example, the location, shape, size, or brightness of the first pattern 25b and the second pattern 25w included in the pattern. It can be reasonably assumed that the shape and size of the first pattern and the second pattern included in the reference data or the relation between the brightness of the first pattern and the brightness of the second pattern included in the reference data are preserved in the transmitted pattern. Moreover, locations where the first transmitted pattern and the second transmitted pattern will appear can be easily predicted since the pattern is formed in the lid 20 in Embodiment 1.

The brightness obtaining unit 43 extracts the first transmitted pattern and the second transmitted pattern from the preview image by comparing the reference data with the preview image.

The brightness obtaining unit 43 further obtains the brightness of the extracted first transmitted pattern and the brightness of the extracted second transmitted pattern. In Embodiment 1, the brightness of the first transmitted pattern and the brightness of the second transmitted pattern are average values. Note that the brightness of the first transmitted pattern and the brightness of the second transmitted pattern may be the mode, median, or some other values.

In FIG. 6, the first transmitted pattern 26b has a brightness of 200 and the second transmitted pattern 26w has a brightness of 250. In FIG. 7, the first transmitted pattern 27b has a brightness of 220 and the second transmitted pattern 27w has a brightness of 250. In FIG. 8, both the first transmitted pattern 28b the second transmitted pattern 28w have a brightness of 250.

The image processing unit 40 computes the difference between the brightness of the first transmitted pattern and the brightness of the second transmitted pattern, and determines whether the difference in brightness is greater than or equal to a predetermined value (S13).

The difference in brightness is 50 in FIG. 6, 30 in FIG. 7, and 0 in FIG. 8.

When the image processing unit 40 determines that the difference in brightness is not greater than or equal to the predetermined value (NO in S13), show-through removal processing is ended since it can be reasonably assumed that show-through will not appear with the current document.

Here, in Embodiment 1, the predetermined value is set to, for example, 20. Note that the predetermined value is set appropriately in accordance with, for example, the configuration of the multifunction peripheral 1A or the type of document to be scanned. Since the difference in brightness in FIG. 8 is 0 and thus lower than the predetermined value, show-through removal processing is ended without making any corrections.

When the image processing unit 40 determines that the difference in brightness is greater than or equal to the predetermined value (YES in S13), show-through removal processing is continued since it can reasonably be assumed that show-through will appear with the current document. Here, since the differences in brightness in FIG. 6 and FIG. 7 are greater than or equal to the predetermined value, show-through removal processing is continued.

The threshold value setting unit 44 computes a threshold value based on the brightness of the first transmitted pattern (S14). The threshold value is for determining the presence or absence of a show-through region.

In Embodiment 1, since the corresponding first pattern 25b is black, the threshold value may be directly set to the lowest brightness value of the first transmitted pattern. When the first pattern 25b is black, the brightness of the densest region of the first transmitted pattern is the highest density value (the lowest brightness value) of the show-through region. In other words, regardless of where in the scanned image show-through appears, it can be reasonably assumed that the density of the show-through region will not exceed the highest density value of the first transmitted pattern. Consequently, when the first pattern is black, the threshold value may be directly set to the lowest brightness value (highest density value) of the first transmitted pattern. Note that even when the first pattern is not black, the threshold value may be set by checking the brightness of the densest show-through region—that is to say, the lowest brightness value of the show-through region. The lowest brightness value of the show-through region may be estimated from the brightness of the pattern. The lowest brightness value of the show-through region varies depending on how much light the document transmits.

As described above, in Embodiment 1, the first pattern 25b produces the densest pattern among the show-through image since it is a black pattern. The brightness of the first transmitted pattern, which is the pattern of the first pattern 25b that is shown through the document, is equivalent to the brightness of the most dense show-through region. Thus, the threshold value is set to the brightness of the show-through pattern corresponding to the pattern 25.

For example, in FIG. 6, the threshold value is set to the brightness value 200 of the first transmitted pattern 26b, and in FIG. 7, the threshold value is set to the brightness value 220 of the first transmitted pattern 27b.

Figure 21:
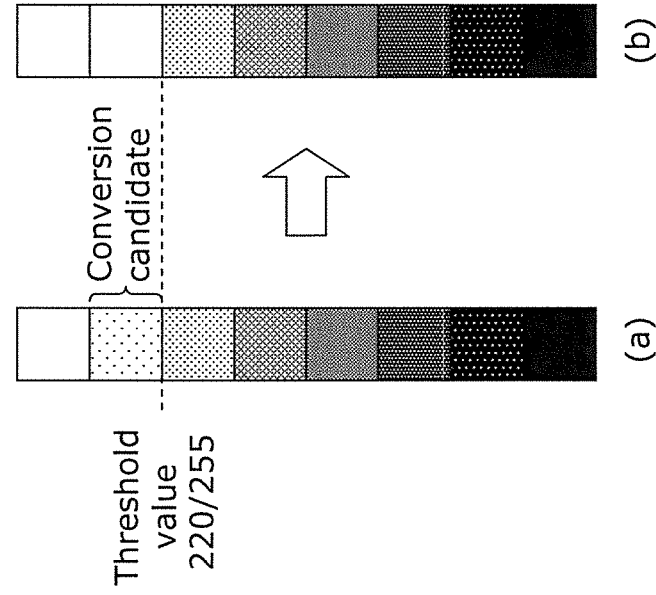
FIG. 21 illustrates one example of a relation between threshold value and brightness.
Figure 22:
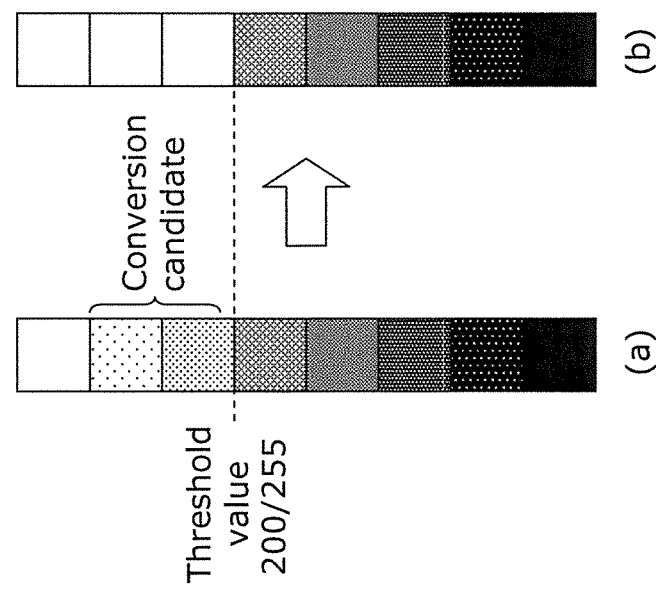
FIG. 22 illustrates one example of a relation between threshold value and brightness.

FIG. 21 and FIG. 22 illustrate the relation between the variation in the threshold value and the brightness of the image to be removed according to Embodiment 1. FIG. 21 illustrates a threshold value set when the document being scanned produces a relatively high degree of show-through, similar to FIG. 6. FIG. 22 illustrates a threshold value set when the document being scanned produces a relatively low degree of show-through, similar to FIG. 7.

The conversion value setting unit 45 sets a conversion value, which is the target brightness of the show-through region (S15). Here, in Embodiment 1, the conversion value setting unit 45 sets the conversion value to a brightness corresponding to the color white. In other words, in Embodiment 1, the conversion value setting unit 45 sets the conversion value to the brightness of the second transmitted pattern, which is the scan result of the second pattern 25w, which is white. In FIG. 6, the threshold value is set to the brightness value 250 of the second transmitted pattern 26w, and in FIG. 7, the threshold value is set to the brightness value 250 of the second transmitted pattern 27w.

The image correction unit 46 replaces the brightness value of regions having a brightness greater than or equal to the threshold value with the conversion value (S16).

As described above, in FIG. 6, the threshold value is 200 and the conversion value is 250. Consequently, as illustrated in (b) in FIG. 21, images having a brightness value of 200 or greater are replaced with the conversion value of 250. More specifically, in FIG. 6, the image 26c, which is a show-through image, has a brightness of 200, and the image 26d has a brightness of 240. Since the brightness values of the images 26c and 26d are greater than or equal to the threshold value of 200, they are replaced with the conversion value of 250. (b) in FIG. 6 illustrates the preview image G12 after the brightness of the processing region has been replaced. The images 26c and 26d are removed in (b) in FIG. 6.

As described above, in FIG. 7, the threshold value is 220 and the conversion value is 250. Consequently, as illustrated in (b) in FIG. 22, images having a brightness value of 220 or greater are replaced with the conversion value of 250. Note that when comparing FIG. 7 and FIG. 6, as can be seen from (b) in FIG. 21 and (b) in FIG. 22, brightness values of 200 through 220 are not converted. More specifically, in FIG. 7, the image 27c, which is a show-through image, has a brightness of 220. Since the brightness value of the image 27c is greater than or equal to the threshold value of 220, it is replaced with the conversion value of 250. (b) in FIG. 7 illustrates the preview image G22 after the brightness value of the processing region has been replaced. The image 27c is removed in (b) in FIG. 7.

The reproduced image output unit 47 converts a preview image on which show-through removal processing has been performed by the image correction unit 46 to, for example, JPG or bitmap format, and outputs the converted image.

1-4 Advantageous Effects

With the image scanner according to Embodiment 1, show-through images can be appropriately removed even with documents that transmit different amount of light, as can be seen from (b) in FIG. 6 and (b) in FIG. 7. Furthermore, with the image scanner according to Embodiment 1, it is possible to minimize an increase in processing load since it is not necessary to precisely compute the light transmittance of the document.

Figure 9:
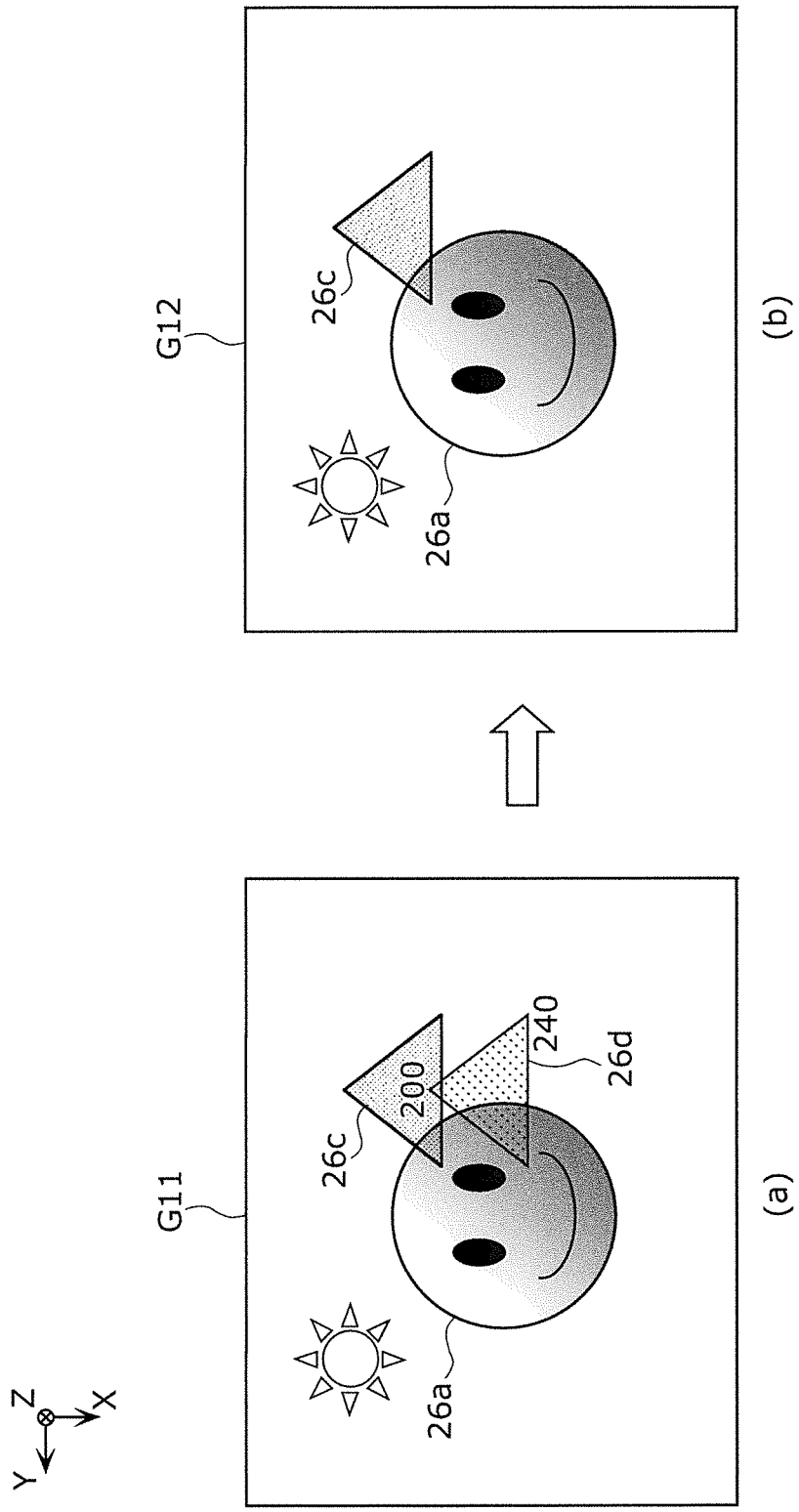
FIG. 9 illustrates one example of preview images before and after conventional show-through removal processing is performed.
Figure 10:
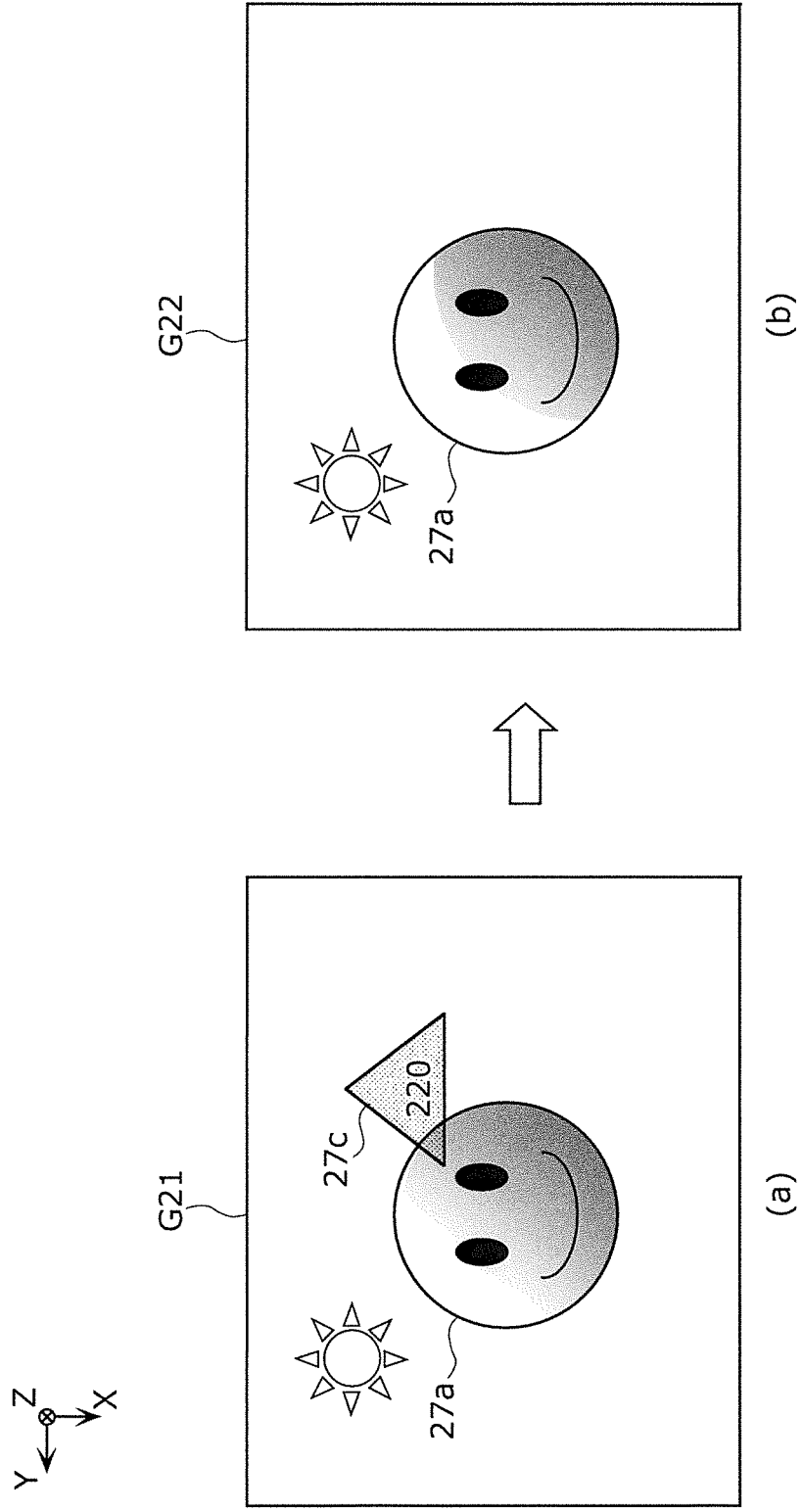
FIG. 10 illustrates one example of preview images before and after conventional show-through removal processing is performed.

Here, FIG. 9 and FIG. 10 illustrate examples of preview images before and after show-through removal processing is performed according to conventional methods. In FIG. 9, the same document is used as the document illustrated in FIG. 6. In FIG. 10, the same document is used as the document illustrated in FIG. 7. Moreover, the threshold value is set to 220 in the examples illustrated in FIG. 9 and FIG. 10.

Since the threshold value is set to 220 with the preview image G12 illustrated in (b) in FIG. 9, the image 26d having a brightness of 240, which is greater than or equal to the threshold value of 220, is removed, but the image 26c having a brightness of 200, which is less than the threshold value of 220, is not removed. In contrast, in the preview image G12 in (b) in FIG. 6 according to Embodiment 1, the image 26c is removed.

Moreover, in the preview image G22 in (b) in FIG. 10, the image 27c is removable, but when comparing the image 27a in (b) in FIG. 10 and the image 27a in (b) in FIG. 7, the white blowout portion in the image 27a in FIG. 7 according to Embodiment 1 is smaller, meaning the image reproduction is more accurate.

With the image scanner according Embodiment 1, since the light transmittance of the document can be accommodated for automatically, show-through can be accurately removed and correction of regions not requiring correction can be reduced, which minimizes a decrease in image reproduction accuracy.

Embodiment 2

In Embodiment 2, the cover unit is not exemplified as the cover, but as a backing sheet.

Similar to Embodiment 1, the image scanner according to Embodiment 2 is exemplified as an image scanner provided in a multifunction peripheral. Similar to the multifunction peripheral according to Embodiment 1, the multifunction peripheral includes functions for printing, for example, in addition to the scanning performed by the image scanner according to Embodiment 2.

The multifunction peripheral includes functions for obtaining a scanned image by scanning a document placed on the platen and printing the obtained scanned image (in other words, a copy of the document).

2-1 Image Scanner Configuration

Figure 11:
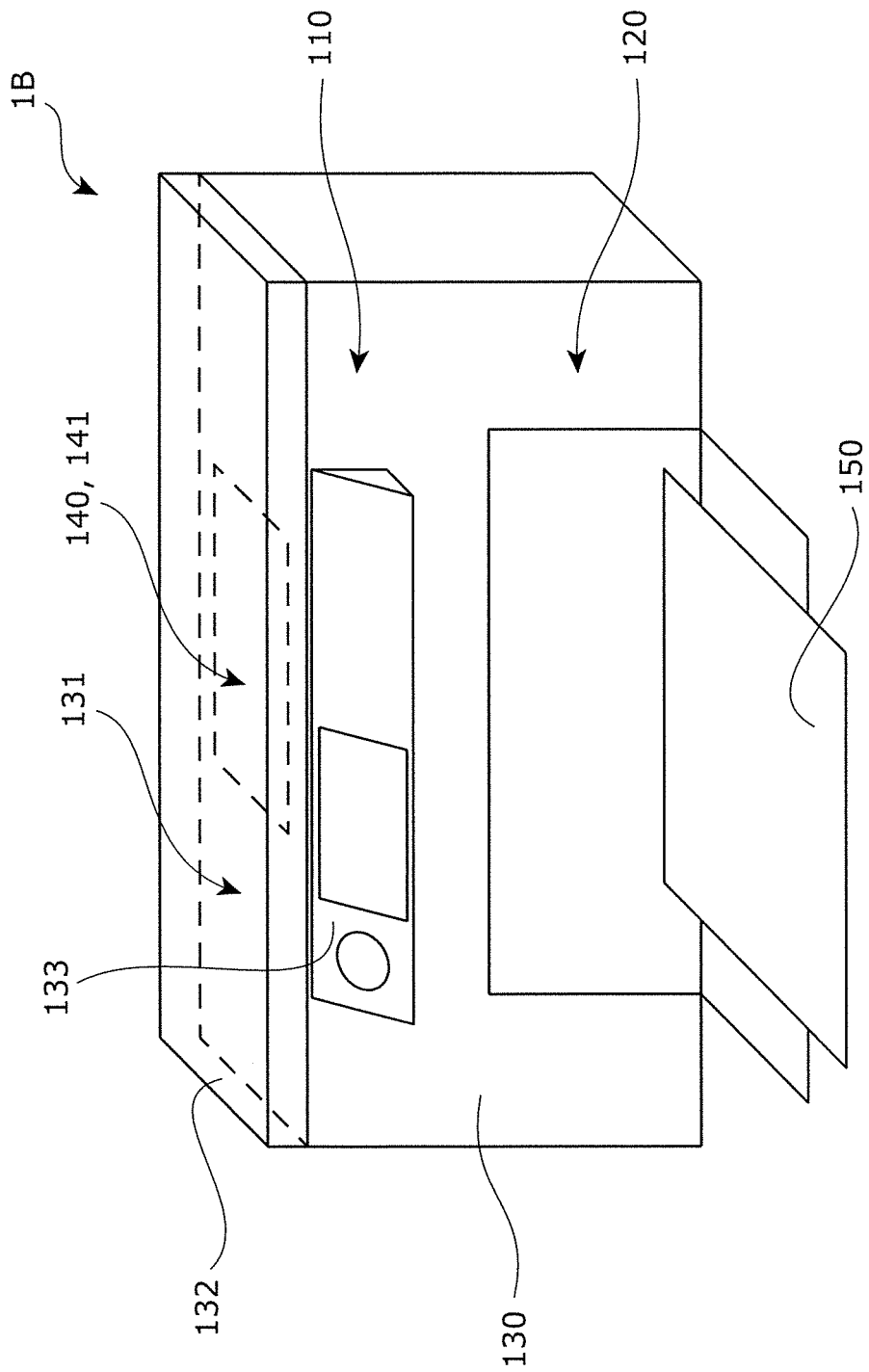
FIG. 11 is a perspective view of one example of an external view of a multifunction peripheral according to Embodiment 2.

FIG. 11 is a perspective view of one example of an external view of the multifunction peripheral.

The multifunction peripheral 1B illustrated in FIG. 11 includes an image scanner 110 and a printer 120 in a single chassis 130. The multifunction peripheral 1B further includes a platen 131 on which the document is placed, an open and closable cover 132 for covering the platen 131, and a control panel 133 including switches and a display.

The platen 131 can accommodate a document 140 and a backing sheet 141 layered behind the document 140. The image scanner 110 scans the document 140 while the backing sheet 141 layered behind the document 140 and obtains a scanned image. The image scanner 110 can also obtain an image by scanning only one of the document 140 and the backing sheet 141.

Paper 150 printed by the printer 120 is output from the chassis 130.

Figure 12:
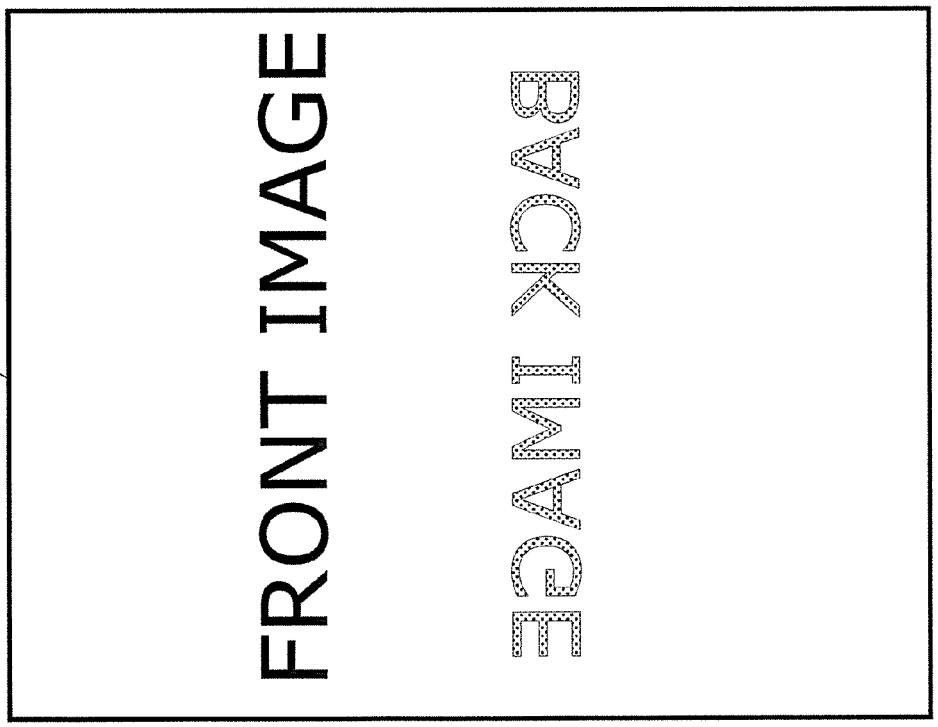
FIG. 12 illustrates one example of a document to be scanned.

FIG. 12 illustrates one example of the document 140. The document 140 illustrated in FIG. 12 is a duplexed document including a front image on one side and a back image on the other side. Moreover, the document 140 also produces the previously discussed show-through.

Figure 13:
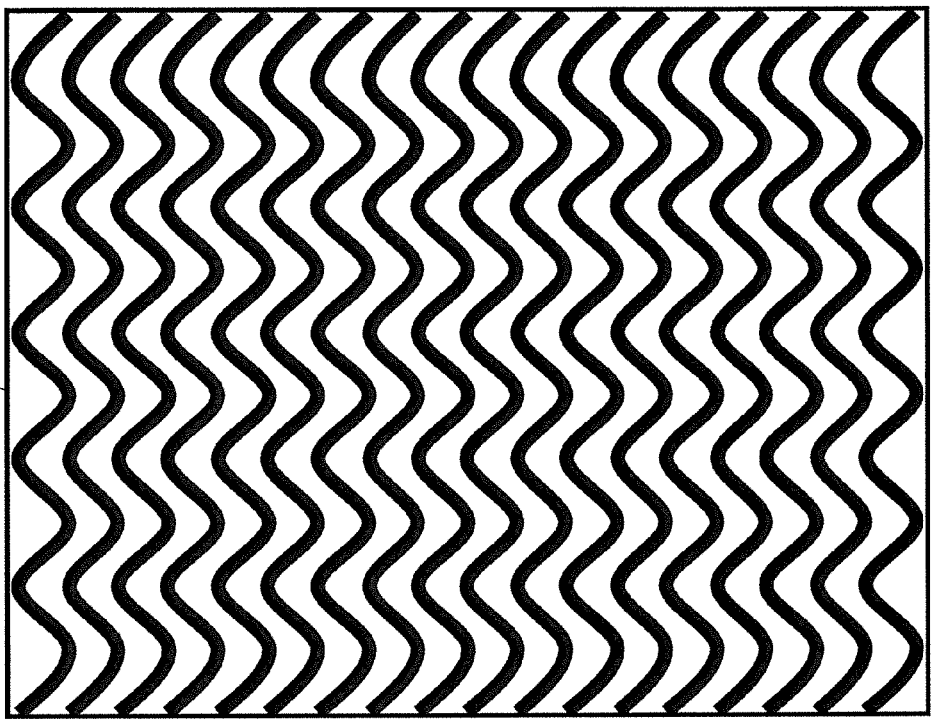
FIG. 13 illustrates one example of a backing sheet according to Embodiment 2.

FIG. 13 illustrates one example of the backing sheet 141. The backing sheet 141 is a paper or plastic sheet having a reference pattern illustrated thereon. The reference pattern may be a pattern not included in the document or a pattern that is autocorrelated, so as to be easily detectable when it is superimposed in the scanned image. As one example, the backing sheet 141 illustrated in FIG. 13 has a wave reference pattern that covers the entire surface.

The backing sheet 141 is not fixed to either the multifunction peripheral 1B or the document 140, and can be freely separated from the multifunction peripheral 1B and the document 140. With this, unlike the image scanner described in the Background section, the image scanner 110 does not require a pattern that can be superimposed in the scanned image when the document is scanned. For example, the surface that holds down the document on the bottom of the cover 132 may be completely blank.

Figure 14:
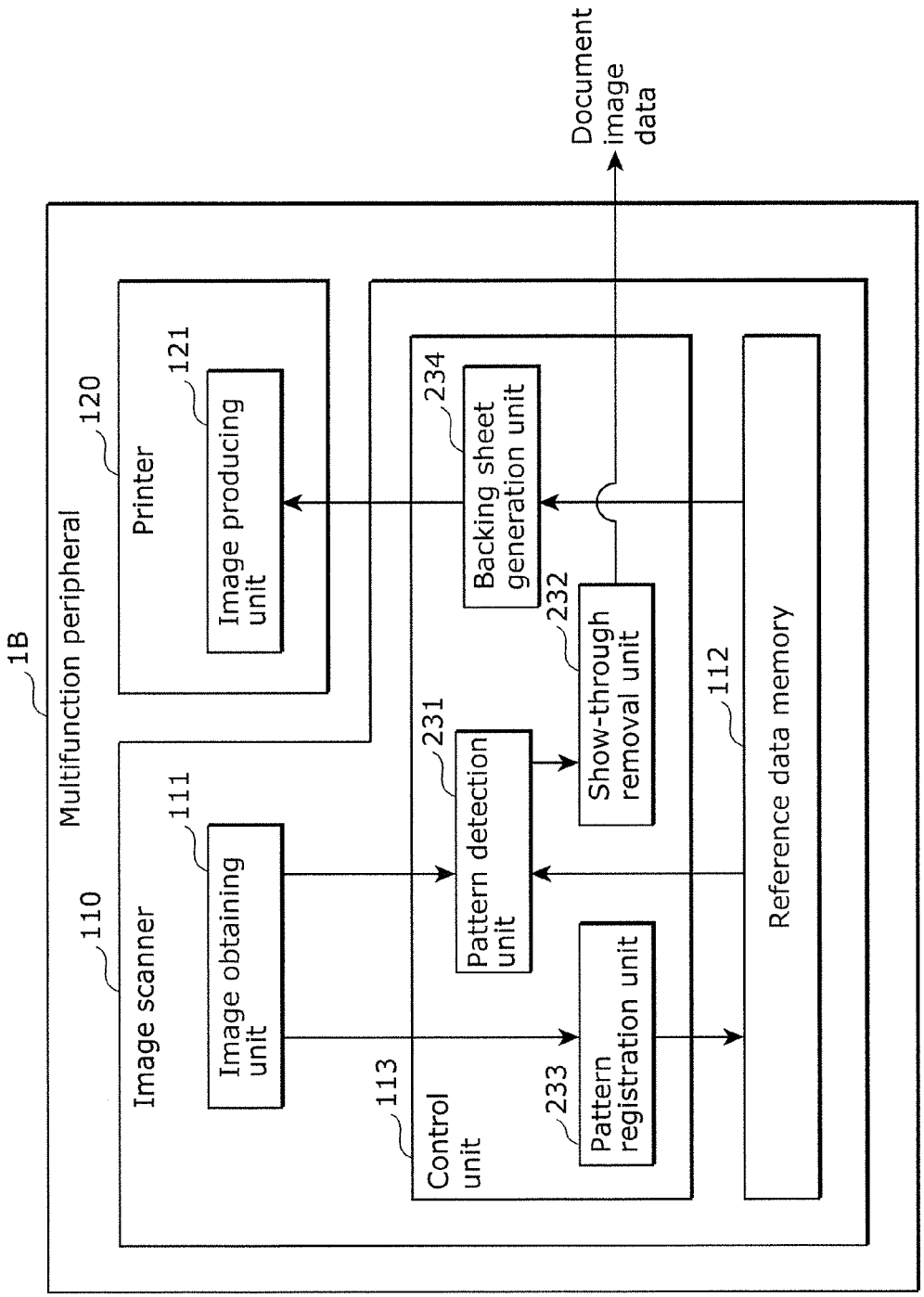
FIG. 14 is a block diagram of one example of a functional configuration of a multifunction peripheral according to Embodiment 2.

FIG. 14 is a block diagram illustrating one example of a functional configuration of the multifunction peripheral 1B.

As illustrated in FIG. 14, in the multifunction peripheral 1B, the image scanner 110 includes an image obtaining unit 111, a reference data memory 112, and a control unit 113. The printer 120 includes an image producing unit 121.

The image obtaining unit 111 is hardware that obtains a scanned image by scanning the document under control by the control unit 113.

The image producing unit 121 is hardware that prints an image on printing media under control by the control unit 113.

The reference data memory 112 stores reference data representing the reference pattern illustrated on the backing sheet 141. The reference data memory 112 may be, for example, a flash memory or hard disk device. Note that the reference data may be an image of the reference pattern, the shape and size of the reference pattern, or the location where the reference pattern appears (estimated location), for example. In Embodiment 2, the cover unit is the backing sheet 141, and although it is not fixed in place like in Embodiment 1, a corner of the backing sheet 141 is aligned with the scanning reference location along with a corner of the document, which makes it possible to estimate the location where the reference pattern appears with sufficient accuracy.

The reference data memory 112 may store multiple reference patterns. The image reproduction accuracy can be increased by selecting a reference pattern suitable for the image to be scanned. Alternatively, a preferable configuration is one that generates multiple preview images using the multiple reference patterns and allows the user to select one that is accurately reproduced.

The control unit 113 is a functional unit that controls the image obtaining unit 111 and the image producing unit 121, and processes the scanned image obtained by the image obtaining unit 111.

The control unit 113 also functions as the image processing unit that removes show-through. Related to the removal of show-through, the control unit 113 includes a pattern detection unit 231, a show-through removal unit 232, a pattern registration unit 233, and a backing sheet generation unit 234. The control unit 113 may be implemented as a processor, for example. The processor may function as the image processing unit by executing a given computer program.

The pattern detection unit 231 references the reference data in the reference data memory 112 and detects a specific region of the scanned image, which is a region of the scanned image that includes the reference pattern as represented by the reference data.

The show-through removal unit 232 removes show-through included in the scanned image by comparing the brightness of the darkest portion of the specific region (the lowest brightness value) with a threshold value, and outputs scanned image data representing a corrected scanned image removed of show-through.

The pattern registration unit 233 registers, in the reference data memory 112, as reference data, data representing a reference image obtained by the image obtaining unit 111 scanning the backing sheet 141.

The backing sheet generation unit 234 prints with the printer 120 the reference pattern as represented by the reference data stored in the reference data memory 112.

2-2 Show-Through Removal Processing Flow

Next, operations of the above-described image scanner 110 will be described.

Figure 15:
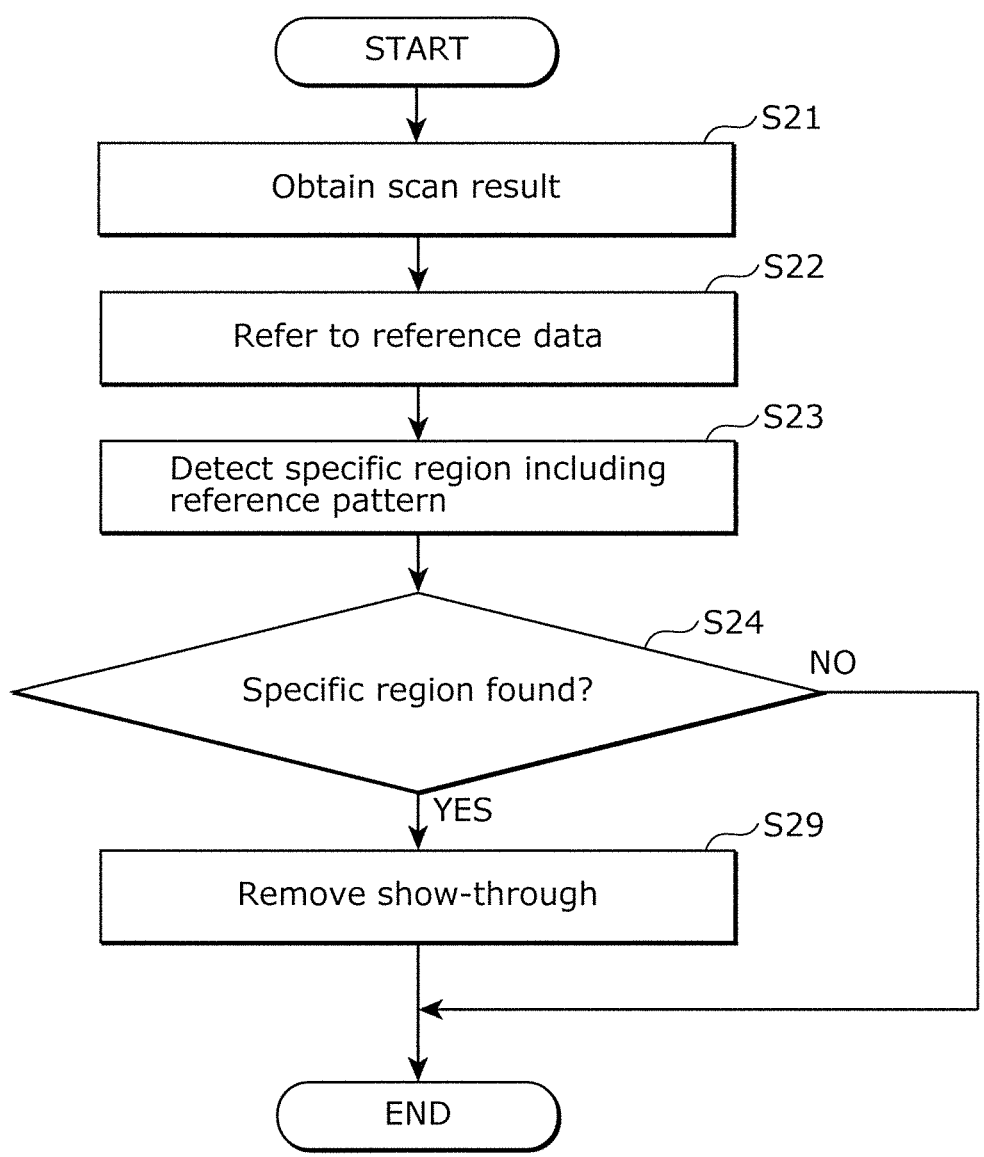
FIG. 15 is a flow chart of one example of operations performed by an image scanner according to Embodiment 2.

FIG. 15 is a flow chart of one example of operations performed by the image scanner 110 according to Embodiment 2.

The image obtaining unit 111 obtains a scanned image by scanning the document 140 while the backing sheet 141 is layered behind the document 140 such that the side of the backing sheet 141 depicting the reference pattern is facing the back side of the document 140 (S21).

FIG. 16 illustrates one example of the obtained scanned image. In the scanned image 160 illustrated in FIG. 16, the show-through, which is the image depicted on the back side of the document 140, and the reference pattern of the backing sheet 141 are superimposed with the image depicted on the front surface of the document 140.

The pattern detection unit 231 references the reference data in the reference data memory 112 (S22) and detects a specific region of the scanned image, which is a region of the scanned image that includes the reference pattern as represented by the reference data (S23). In the example in FIG. 16, the specific region 161 is detected from the scanned image 160.

When a specific region is found (YES in S24), the show-through removal unit 232 removes show-through included in the scanned image by comparing the brightness of the darkest portion of the specific region with a threshold value (S29). For example, the show-through removal unit 232 may, similar to Embodiment 1, remove both the show-through and the reference pattern from the scanned image by increasing and equalizing the brightness of portions just as bright or brighter than the darkest portion of the specific region.

In step S29, since the brightness of the darkest portion of the specific region is compared with a threshold value, it is possible to appropriately remove show-through without having to precisely compute the light transmittance of the document 140. Moreover, since the brightest portion of the specific region corresponds to the base color of the document 140, it is possible to automatically remove the base color of the document 140 in, and at the same time as, the processing for the show-through removal.

FIG. 17 illustrates one example of the corrected scanned image removed of show-through. Both the show-through and the reference pattern are removed from the corrected scanned image 163 illustrated FIG. 17 by increasing the brightness of portions just as bright or brighter than the darkest portion 162 of the specific region 161 of the scanned image 160.

Note that when the document is a heavyweight document, the reference pattern of the backing sheet may not transmit through the document and the specific region may not be visible. In this case, it can be reasonably assumed that show-through is also not produced.

Therefore, when a specific region is not found (NO in S24), the scanned image obtained in step S21 is used as the result of the scan, without performing the image processing in step S29.

Moreover, when the document is a lightweight, single-sided document, it is possible to obtain the scanned image by scanning only the document without layering the backing sheet. In this case, since a specific region is not found, the scanned image obtained in step S21 is used as the result of the scan, without performing the image processing in step S29.

2-3 Advantageous Effects

With the image scanner 110 according to Embodiment 2, the backing sheet 141 is freely separable from both the image scanner 110 and the document 140. When the document 140 is a single-sided document, it is possible to obtain a scan result whose image quality is not affected by image processing by scanning only the document 140 without layering the backing sheet 141.

As described above, with the image scanner 110 according to Embodiment 2, it is possible to superimpose the reference pattern for removing show-through on the scanned image by scanning the document 140 while the backing sheet 141 is placed behind the document 140, thereby eliminating the need to provide the main body of the image scanner 110 with a fixed reference pattern.

This eases design restrictions for the image scanner 110 and restrictions that limit product development flexibility, making it possible to achieve an image scanner suitable for removing show-through.

Embodiment 3

In Embodiment 3, the operations performed by the image scanner 110 when the backing sheet 141 extends beyond an edge of the document 140 are described.

FIG. 18 is a flow chart of one example of operations performed by the image scanner 110 according to Embodiment 3. In contrast to the flow chart FIG. 15, the flow chart in FIG. 18 includes steps S25 through S28 for processing an extending portion.

The extending portion refers to a portion of the backing sheet 141 that extends beyond an edge of the document 140, and in the scanned image, the reference pattern in the extending portion of the backing sheet 141 is reproduced in its original brightness since it is not transmitted through the document 140.

In the operations according to Embodiment 3, a scanned image having such an extending portion is assumed to be obtained in step S21.

FIG. 19 illustrates one example of the obtained scanned image. In the scanned image 170 illustrated in FIG. 19, a portion of the reference pattern not transmitted through the document 140 is shown in the extending portion 173.

The pattern detection unit 231 detects a specific region of the scanned image, which is a portion of the scanned image that includes the reference pattern (S23). In the example illustrated using the scanned image 170, the portion including the specific region 171 and the extending portion 173 is initially detected as the specific region.

When an initial specific region is found (YES in S24), the pattern detection unit 231 detects an extending portion in the initial specific region (S25). For example, the pattern detection unit 231 may detect the extending portion by detecting a portion of the initial specific region where the brightness of the dark portion of the reference pattern is lower than a given threshold value. The pattern detection unit 231 may also detect the extending portion by detecting a rectangular region extrapolated from the detected portion. In the example illustrated using the scanned image 170, the portion of the reference pattern where the brightness of the dark portion 174 is lower than a given threshold value is detected as the extending portion 173.

When an extending portion is found (YES in S26), the pattern detection unit 231 excludes the extending portion 173 from the initial specific region (S27), and the show-through removal unit 232 removes the extending portion from the scanned image (S28). The show-through removal unit 232 removes show-through included in the scanned image by comparing the brightness of the darkest portion of the specific region with a threshold value after the extending portion has been excluded (S29). In the example illustrated using scanned image 170, the brightness of the darkest portion 172 of the specific region 171 excluding the extending portion 173 is compared with the threshold value.

FIG. 20 illustrates one example of a corrected scanned image from which show-through and the extending portion are removed. In addition to both show-through and the reference pattern, the extending portion 173 is also removed from the corrected scanned image 175 illustrated in FIG. 20 by increasing the brightness of portions just as bright or brighter than the darkest portion 172 of the specific region 171 excluding the extending portion 173 of the scanned image 170.

As described above, with the image scanner 110 according to Embodiment 3, when the backing sheet 141 is larger than the document 140, it is possible to appropriately process the extending portion 173 of the backing sheet 141 extending from an edge of the document 140 in the show-through removal processing.

Embodiment 4

Operations for the registering of the reference pattern depicted on the backing sheet used in Embodiments 2 and 3 and the printing of the backing sheet for the image scanner 110 are described in Embodiment 4.

The user prepares a sheet on which a given image is illustrated as the backing sheet 141. The backing sheet 141 prepared by the user may be, for example, a piece of paper on which the user him or herself has drawn a reference pattern.

In the image scanner 110, the pattern registration unit 233 registers, in the reference data memory 112, as reference data, data representing a reference image obtained by the image obtaining unit 111 scanning the backing sheet 141 prepared by the user.

Configuring the image scanner 110 in this manner allows for a given image to be registered as the reference pattern. This makes it possible to, for example, use a backing sheet 141 depicting a reference pattern not included in the document on a case-by-case basis to remove the show-through absolutely.

Moreover, in the image scanner 110, the backing sheet generation unit 234 prints with the printer 120 the reference pattern as represented by the reference data stored in the reference data memory 112.

Configuring the image scanner 110 in this manner allows for printing of the backing sheet depicting the reference pattern as needed. This makes it possible to immediately generate a new backing sheet if, for example, the backing sheet is lost or damaged.

Additional Embodiments

The image scanner has hereinbefore been described based on illustrative embodiments of the present invention, but the present invention is not limited to these illustrative embodiments.

(1) For example, in Embodiment 1, the show-through removal processing is described as being performed on the preview image, but the show-through removal processing may be performed on, for example, a bitmap format or JPEG format output image instead of a preview image.

In this case, the size of the first pattern 25$b$ and the second pattern 25$w$ is determined according to the scanning method of the image scanner.

For example, with an image scanner that outputs, for example, a bitmap format or GIF format image, even a single pixel image is acceptable.

Moreover, in contrast to bitmap format or GIF format, with an image scanner that outputs a compressed file with compression which affects surrounding pixels, such as is the case with JPG format, for example, even an image approximately the size of 5 by 5 pixels is acceptable.

(2) In Embodiment 1, the pattern 25 includes a black first pattern 25$b$ and a white second pattern 25$w$, but the pattern 25 is not limited to this example. The first pattern 25$b$ and the second pattern 25$w$ may have other brightness values.

Moreover, the second pattern 25$w$ may be omitted when the holding component 21 is the same color as the second pattern 25$w$. For example, when the holding component 21 and the second pattern 25$w$ are both white, the second pattern 25$w$ may be omitted.

(3) In Embodiment 1, the threshold value is directly set to the brightness of the first transmitted pattern, but the threshold value is not limited to this example. The threshold value may be set to a value offset from the brightness of the first transmitted pattern by a given margin or set to a different value.

Moreover, in the above embodiments, the conversion value is directly set to the brightness of the second transmitted pattern, but the conversion value is not limited to this example. The conversion value may be a fixed brightness corresponding to white set in advance, or to a value offset by a given margin.

(4) In Embodiments 1 through 4, the image scanner is exemplified as being included in a multifunction peripheral, but this example is not limiting. The image scanner may be a standalone image scanner, or included in a different device, such as a photocopier.

(5) Note that when the image processing unit is realized by a computer executing a program, an IC card or standalone module recorded with the program may be detachably attached to the image scanner or a device including the image scanner. The IC card and the module are computer systems including a microprocessor, ROM, and RAM, for example. The IC card and the module may include the above super-multifunction LSI. The IC card and the module achieve their function as a result of the microprocessor operating according to a computer program. The IC card and the module may be tamperproof.

Moreover, the present invention may be the above method. The present invention may also be a computer program realizing these methods with a computer, or a digital signal of the computer program.

The present invention may also be realized as the computer program or the digital signal stored on non-transitory computer-readable storage media, such as a flexible disk, hard disk, CD-ROM, MO, DVD, DVD-ROM, DVD-RAM, DVD-RAM, BD (Blu-ray™ Disc), or a semiconductor memory. The present invention may also be the digital signal stored on the above non-transitory storage media.

The present invention may also be realized by transmitting the computer program or the digital signal via, for example, an electric communication line, a wireless or wired line, a network such as the Internet, or data broadcasting.

The present invention may also be a computer system including memory storing the computer program and a microprocessor operating according to the computer program.

The computer program or the digital signal may also be implemented by an independent computer system by being stored on the non-transitory storage media and transmitted, or sent via the network, for example.

Although the present invention has been described and illustrated in detail, it is clearly understood that the same is by way of example only and is not to be taken by way of limitation, the scope of the present invention being limited only by the terms of the appended claims.

INDUSTRIAL APPLICABILITY

The image scanner according to the above embodiments is applicable to image scanners used in, for example, photocopiers, scanners, or multifunction peripherals including the functions of these devices.

The invention claimed is:
1. An image scanner comprising:
a platen on which a document is placed;
a cover unit on which a pattern is depicted;
a scanning unit that scans the document between the platen and the cover unit; and
an image processing unit that sets a threshold value using information on a transmitted pattern of the pattern, obtained through the document, and performs image processing based on the threshold value,
wherein the information on the transmitted pattern is a brightness of the transmitted pattern, and
wherein the image processing unit removes, from a result of the scan, an image appearing in a processing region having a brightness greater than or equal to the threshold value.

2. The image scanner according to claim 1,
wherein the image processing unit sets the threshold value to a brightness of the transmitted pattern.

3. The image scanner according to claim 1,
wherein the pattern of the cover unit includes a first pattern and a second pattern less dense than the first pattern, and
the image processing unit corrects a brightness of the processing region based on a brightness of a second transmitted pattern obtained from the result of the scan and corresponding to the second pattern.

4. The image scanner according to claim 3,
wherein the image processing unit converts the brightness of the processing region to the brightness of the second transmitted pattern.

5. The image scanner according to claim 3,
wherein the image processing unit does not correct the brightness of the processing region when a difference between a brightness of a first transmitted pattern and the brightness of the second transmitted pattern is less than or equal to a predetermined value, the first transmitted pattern obtained from the result of the scan and corresponding to the first pattern.

6. The image scanner according to claim 1,
wherein while the cover unit is disposed in a location corresponding to a scanning reference location to which a corner of the document is aligned, a location of the pattern depicted on the cover unit corresponds to the scanning reference location, and
the scanning unit scans the document while the cover unit is disposed in the location corresponding to the scanning reference location.

7. The image scanner according to claim 1, further comprising:
a reference data memory in which reference data representing the pattern is stored in advance; and
a detection unit that uses the reference data to detect, in a scanned image obtained from the result of the scan, a specific region including the transmitted pattern,
wherein the image processing unit sets the threshold value based on a brightness of the specific region detected by the detection unit.

8. The image scanner according to claim 7,
wherein the detection unit detects an extending portion extending beyond an edge of the document by detecting a portion of the specific region having a brightness lower than a predetermined value, and excludes the extending portion from the specific region, and
the image processing unit removes the extending portion from the scanned image.

9. An image scanning method comprising:
scanning a first side of a document while a cover unit on which a first pattern is depicted is in contact with a second side of the document opposite the first side;
obtaining a brightness of a first transmitted pattern corresponding to the first pattern from a result of the scanning;
setting a threshold value based on the brightness of the first transmitted pattern; and
removing show-through appearing in a processing region having a brightness greater than or equal to the threshold value from the result of the scanning.

10. The image scanning method according to claim 9,
wherein the cover unit further depicts a second pattern less dense than the first pattern, and
the image scanning method further comprises:
obtaining a brightness of a second transmitted pattern corresponding to the second pattern from the result of the scanning; and
determining whether a difference between the brightness of the first transmitted pattern and the brightness of the second transmitted pattern is less than or equal to a predetermined value,
wherein the removing is not performed when the difference is less than or equal to the predetermined value.

11. An image scanner comprising:
a platen on which a document is placed;
a cover unit on which a marking is depicted;
a scanning unit that scans the document between the platen and the cover unit; and
an image processing unit that sets a threshold value using information on a transmitted marking of the marking, obtained through the document, and performs image processing based on the threshold value, wherein the information on the transmitted marking is a brightness of the transmitted marking, and wherein the image processing unit removes, from a result of the scan, an image appearing in a processing region having a brightness greater than or equal to the threshold value.

12. The image scanner according to claim 11, wherein the image processing unit sets the threshold value to a brightness of the transmitted marking.

13. The image scanner according to claim 11, wherein the marking of the cover unit includes a first marking and a second marking less dense than the first marking, and the image processing unit corrects a brightness of the processing region based on a brightness of a second transmitted marking obtained from the result of the scan and corresponding to the second marking.

14. The image scanner according to claim 13, wherein the image processing unit converts the brightness of the processing region to the brightness of the second transmitted marking.

15. The image scanner according to claim 13, wherein the image processing unit does not correct the brightness of the processing region when a difference between a brightness of a first transmitted marking and the brightness of the second transmitted marking is less than or equal to a predetermined value, the first transmitted marking obtained from the result of the scan and corresponding to the first marking.

16. The image scanner according to claim 11, wherein while the cover unit is disposed in a location corresponding to a scanning reference location to which a corner of the document is aligned, a location of the marking depicted on the cover unit corresponds to the scanning reference location, and the scanning unit scans the document while the cover unit is disposed in the location corresponding to the scanning reference location.

17. The image scanner according to claim 11, further comprising:

a reference data memory in which reference data representing the marking is stored in advance; and a detection unit that uses the reference data to detect, in a scanned image obtained from the result of the scan, a specific region including the transmitted marking, wherein the image processing unit sets the threshold value based on a brightness of the specific region detected by the detection unit.

18. The image scanner according to claim 17, wherein the detection unit detects an extending portion extending beyond an edge of the document by detecting a portion of the specific region having a brightness lower than a predetermined value, and excludes the extending portion from the specific region, and the image processing unit removes the extending portion from the scanned image.

19. An image scanning method comprising:

scanning a first side of a document while a cover unit on which a first marking is depicted is in contact with a second side of the document opposite the first side;

obtaining a brightness of a first transmitted marking corresponding to the first marking from a result of the scanning;

setting a threshold value based on the brightness of the first transmitted marking; and removing show-through appearing in a processing region having a brightness greater than or equal to the threshold value from the result of the scanning.

20. The image scanning method according to claim 19, wherein the cover unit further depicts a second marking less dense than the first marking, and the image scanning method further comprises:

obtaining a brightness of a second transmitted marking corresponding to the second marking from the result of the scanning; and determining whether a difference between the brightness of the first transmitted marking and the brightness of the second transmitted marking is less than or equal to a predetermined value, wherein the removing is not performed when the difference is less than or equal to the predetermined value.

* * * * *